(12) United States Patent
Funayama et al.

(10) Patent No.: US 9,036,147 B2
(45) Date of Patent: May 19, 2015

(54) SPECTRUM MEASURING APPARATUS

(75) Inventors: Ryuji Funayama, Yokohama (JP);
Shinya Kawamata, Gotemba (JP);
Yasukata Yokochi, Susono (JP); Masato Endo, Susono (JP); Yasuhiro Yoshida, Susono (JP); Kenichi Kitahama, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 681 days.

(21) Appl. No.: 13/322,019

(22) PCT Filed: May 29, 2009

(86) PCT No.: PCT/JP2009/059916
§ 371 (c)(1),
(2), (4) Date: Jan. 19, 2012

(87) PCT Pub. No.: WO2010/137176
PCT Pub. Date: Dec. 2, 2010

(65) Prior Publication Data
US 2012/0105846 A1    May 3, 2012

(51) Int. Cl.
*G01J 3/28* (2006.01)
*G01J 3/02* (2006.01)
(Continued)

(52) U.S. Cl.
CPC .............. *G01J 3/0229* (2013.01); *G01J 3/02* (2013.01); *G01J 3/021* (2013.01); *G01J 3/0235* (2013.01); *G01J 3/0294* (2013.01); *G01J 3/04* (2013.01); *G01J 3/32* (2013.01); *G01J 3/36* (2013.01)

(58) Field of Classification Search
CPC ......... G01J 3/02; G01J 3/0229; G01J 3/0262; G01J 3/0235

USPC ................................... 356/326–328; 359/232
See application file for complete search history.

(56) References Cited

U.S. PATENT DOCUMENTS 3,751,721 A    8/1973  Fulton
4,375,919 A *  3/1983  Busch ........................... 356/328
(Continued)

FOREIGN PATENT DOCUMENTS

DE            296 154 A5    11/1991
DE    10 2004 019 651 A1    11/2005
(Continued)

OTHER PUBLICATIONS

Office Action issued May 2, 2013, in German Patent Application No. 11 2009 004 831.5 (with English-language translation).
(Continued)

*Primary Examiner* — Kara E Geisel
(74) *Attorney, Agent, or Firm* — Oblon, McClelland, Maier & Neustadt, L.L.P.

(57) ABSTRACT

Disclosed is a spectrum measuring apparatus for shortening such a measurement time period for an object being measured including two or more mutually different measurement portions as is required for the spectrum measurements of the lights from individual measurement portions. The spectrum measuring apparatus comprises a slit group having two or more slits, a spectroscope for separating the lights extracted by the slit group, for the individual slits, and a measuring unit for measuring the intensities of the individual components, which are separated by the spectroscope, for the slits. The individual slits extract such ones of the lights coming from an object being measured including two or more mutually different measurement portions, as come from the individual measurement portions.

11 Claims, 8 Drawing Sheets

(51) Int. Cl.
*G01J 3/04* (2006.01)
*G01J 3/32* (2006.01)
*G01J 3/36* (2006.01)

(56) References Cited

U.S. PATENT DOCUMENTS

| | | | |
|---|---|---|---|
| 4,810,091 A * | 3/1989 | Sullivan | 356/326 |
| 6,122,051 A | 9/2000 | Ansley et al. | |
| 6,856,354 B1 | 2/2005 | Ohsawa | |
| 7,031,496 B2 | 4/2006 | Shimano et al. | |
| 7,415,338 B2 | 8/2008 | Monji et al. | |
| 2004/0155202 A1 | 8/2004 | Poteet et al. | |
| 2004/0218177 A1 | 11/2004 | MacKinnon et al. | |
| 2007/0103679 A1 * | 5/2007 | Yoo | 356/301 |
| 2007/0179712 A1 | 8/2007 | Brandt et al. | |
| 2007/0246648 A1 | 10/2007 | Frey Jr., et al. | |
| 2010/0097200 A1 | 4/2010 | Hilsebecher et al. | |
| 2010/0182294 A1 | 7/2010 | Roshan et al. | |
| 2010/0328659 A1 * | 12/2010 | Bodkin | 356/326 |

FOREIGN PATENT DOCUMENTS

| | | |
|---|---|---|
| DE | 10 2005 024 716 A1 | 12/2006 |
| DE | 10 2008 016 766 A1 | 11/2009 |
| EP | 0 642 005 | 3/1995 |
| JP | 01 273113 | 11/1989 |
| JP | 08 193945 | 7/1996 |
| JP | 10 221036 | 8/1998 |
| JP | 10 341458 | 12/1998 |
| JP | 2000 113159 | 4/2000 |
| JP | 2000 152269 | 5/2000 |
| JP | 2000 251052 | 9/2000 |
| JP | 2001 165775 | 6/2001 |
| JP | 2001 296180 | 10/2001 |
| JP | 2002 083297 | 3/2002 |
| JP | 2004 280591 | 10/2004 |
| JP | 2005 170063 | 6/2005 |
| JP | 2005 242914 | 9/2005 |
| JP | 2005 283336 | 10/2005 |
| JP | 2005 286649 | 10/2005 |
| JP | 2006 011671 | 1/2006 |
| JP | 2006 507483 | 3/2006 |
| JP | 2006 145362 | 6/2006 |
| JP | 2006 222899 | 8/2006 |
| JP | 2007 293558 | 11/2007 |
| JP | 2008 124941 | 5/2008 |
| JP | 2009 014373 | 1/2009 |
| JP | 2009 105576 | 5/2009 |
| WO | 99 06331 | 12/1999 |
| WO | 2007 126004 | 11/2007 |

OTHER PUBLICATIONS

Kolodner, M. A., "Automated target detection system for hyperspectral imaging sensors," Applied Optics, vol. 47, No. 28, pp. F61-F70, (Oct. 1, 2008).

International Search Report Issued Jun. 30, 2009 in PCT/JP09/059916 Filed May 29, 2009.

International Preliminary Report on Patentability Issued Apr. 12, 2011 in PCT/JP09/059916 Filed May 29, 2009.

U.S. Appl. No. 13/321,968, filed Nov. 22, 2011, Funayama, et al.

U.S. Appl. No. 13/322,508, filed Nov. 25, 2011, Funayama, et al.

U.S. Appl. No. 13/322,503, filed Nov. 25, 2011, Endo, et al.

U.S. Appl. No. 13/322,056, filed Nov. 22, 2011, Kawamata, et al.

Notice of Allowance mailed Feb. 14, 2014, in co-pending U.S. Appl. No. 13/321,968.

Office Action mailed Mar. 29, 2013, in co-pending U.S. Appl. No. 13/322,503.

Office Action issued Apr. 29, 2013 in German Patent Application No. 11 2009 004 829.3 (with English translation).

Office Action issued Jan. 2, 2015 in U.S. Appl. No. 13/322,508.

* cited by examiner

Fig.11 (a) (Prior Art)
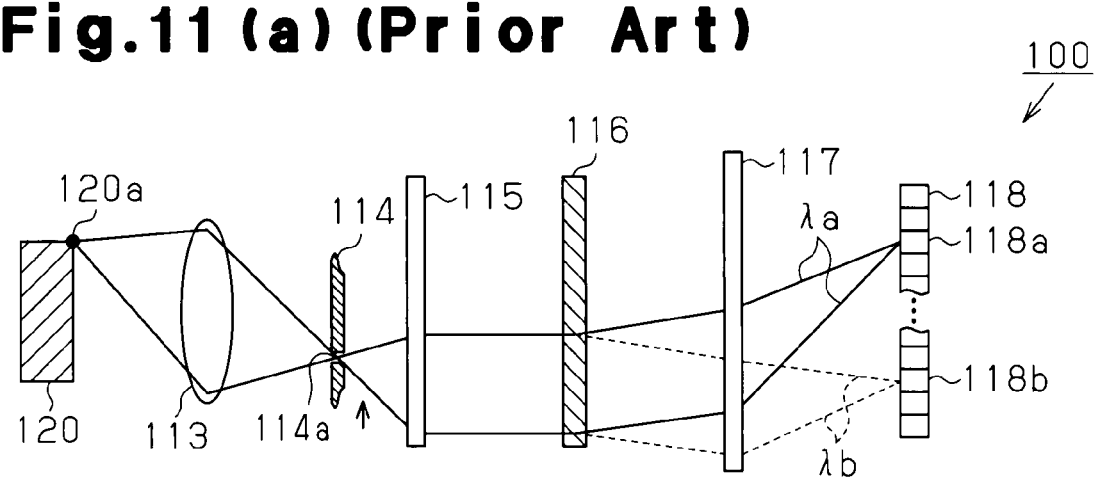
Fig.11 (b) (Prior Art)
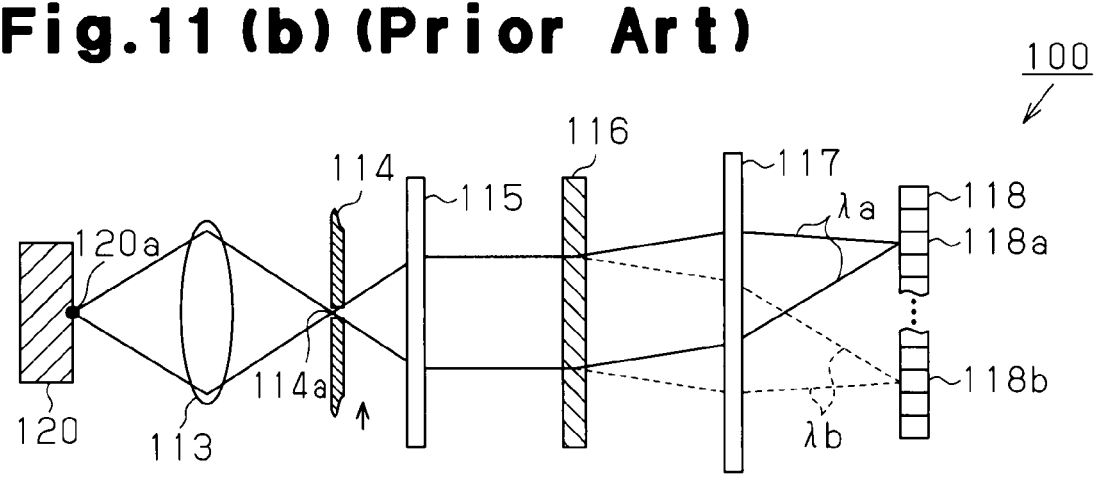
Fig.11 (c) (Prior Art)
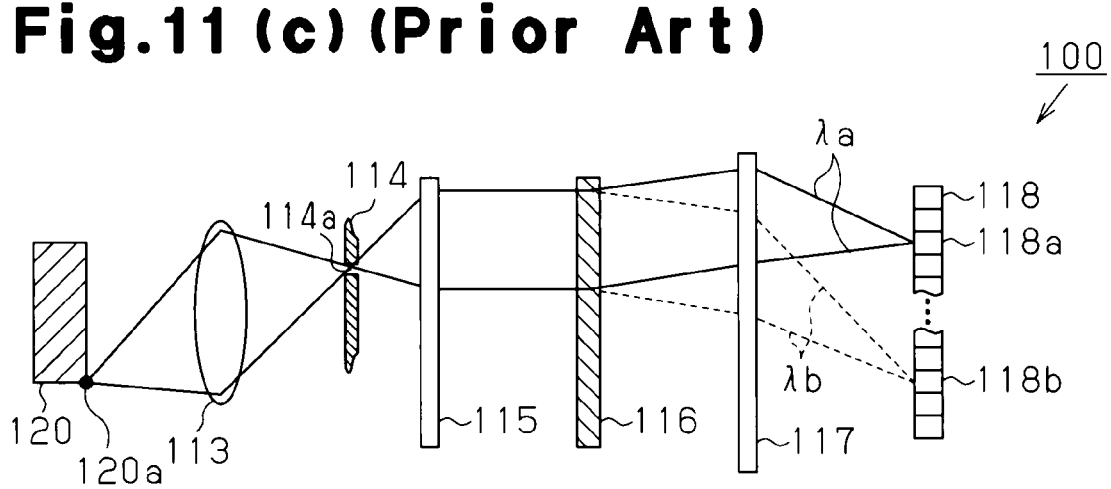

SPECTRUM MEASURING APPARATUS

FIELD OF THE DISCLOSURE

The present invention relates to a spectrum measuring apparatus for measuring light from a measured object as a spectrum, for example, a spectrum measuring apparatus mounted on a mobile body such as a vehicle.

BACKGROUND OF THE DISCLOSURE

In recent years, as a driving assistance technique applied to vehicles such as cars, an imaging device such as a CCD camera has been mounted on a vehicle to capture an image of the surrounding of the vehicle as a visible image. In such driving assistance technique, first, information on a subject requiring driving assistance, for example, a pedestrian, a traffic light and the like around the vehicle, is generated by processing the visible image captured by the imaging device, and driving assistance corresponding to the state surrounding the vehicle is performed based on the information thus generated.

However, the state of the pedestrian walking around the vehicle, such as the number of persons, body build, posture, carried items, and moving direction, varies each time the visible image around the vehicle is captured. Further, when the driving state of the vehicle, such as the turning direction of the vehicle and the attribute of a road on which the vehicle is running, varies, shape and size of the pedestrian and even the traffic light installed on the road in the visible image around the vehicle also vary. As a result, in an aspect of detecting the object necessary for driving assistance from the visible image of an imaging object including the object, driving assistance lacks precision. Thus, in the above-mentioned driving assistance technique, there is a demand for a technique for improving the detecting accuracy of the object in order to improve the accuracy of the driving assistance.

Among techniques for distinguishing an object based on its optical characteristics, patent document 1 describes a known technique using a hyper spectrum sensor as the spectrum measuring apparatus mounted on an artificial satellite for use in soil investigation on the earth. The hyper spectrum sensor described in patent document 1, for example, detects a spectrum so that light from the object is dispersed into components according to each wavelength and optical intensity at each wavelength is associated with the wavelength. In other words, a continuous spectrum with respect to wavelength is handled as the optical characteristics of the object. FIG. 10 is a diagram showing an example of the optical structure of a hyper spectrum sensor serving as such spectrum measuring apparatus.

As shown in FIG. 10, an inlet 111, a mirror 112, a condenser 113, a shielding plate 114, a collimator 115, a spectroscope 116, an imager 117 and a measuring unit 118 are arranged in this order in a hyper spectrum sensor 100 along a light traveling direction. Each element of the hyper spectrum sensor 100 is configured so that optical characteristics are continuous in one direction intersecting a hypothetical light beam representing a light flux that passes the elements, that is, an optical axis (extending in a lateral direction in FIG. 10). In the hyper spectrum sensor 100 having such structure, partial sunlight reflected on an object 120, which is a ground surface serving as a measured object, first enters the apparatus through the inlet 111 and is guided to the condenser 113 by a reflecting action of the mirror 112. The light incident on the condenser 113 is condensed by a condensing action of the condenser 113 toward the shielding plate 114, and only light toward a single slit 114a is guided to the collimator 115 by a shielding action of the shielding plate 114. The light passed through the single slit 114a in this manner is guided to the spectroscope 116 as collimated light by an optical action of the collimator 115 and each parallel beam is dispersed into wavelength components by a spectral action of the spectroscope 116. The wavelength components dispersed by the spectroscope 116 (wavelength component λa to wavelength component λb) are image-formed on regions of the measuring unit 118, which are divided according to wavelength, for example, light receiving elements 118a, 118b of a CCD image sensor or a CMOS image sensor, by an image-forming action of the imager 117.

In such hyper spectrum sensor 100, the spectrum of only the light passed through the single slit 114a of the light condensed by the condenser 113 is measured. In other words, in the light from the object 120 as the ground surface, only the light from a linear measuring part 120a in a direction in which the optical characteristics are continuous in the single slit 114a, that is, a longitudinal direction Dm of the single slit 114a, is extracted by the single slit 114a. Then, only optical information on the linear measuring part 120a is input to the hyper spectrum sensor 100 each time. Thus, in the hyper spectrum sensor 100, by repeating spectrum measurement of the one-dimensional measuring part 120a along a flight direction of the artificial satellite, the optical characteristics of the object 120, which is a two-dimensional ground surface, are measured.

PRIOR ART DOCUMENTS

Patent Documents

Patent Document 1: Japanese Laid-Open Patent Publication No. 2006-145362

SUMMARY

Problems to be Solved by the Invention

In the above hyper spectrum sensor 100, the direction in which the hyper spectrum sensor 100 moves with respect to the object 120 is the direction in which the measuring part 120a is arranged. The two-dimensional range serving as the spectrum measured object is limited by the moving direction Dr at all times. Thus, when measuring the spectrum of the measured object including two or more different measuring parts 120a arranged in a direction differing from the moving direction Dr, such as a scene around a vehicle that includes a pedestrian and a traffic light, is measured, the single slit 114a must scan in a direction intersecting the longitudinal direction Dm. FIGS. 11(a), 11(b) and 11(c) are diagrams showing scanning examples of the single slit 114a together with optical operations.

As shown in FIG. 11(a), the single slit 114a is arranged so that the measuring part 120a at an upper end of the object 120 is an object point and the single slit 114a provided on the shielding plate 114 is an image point to first measure the spectrum of the measuring part 120a at the upper end of the object 120. Next, by repeating scanning in which the shielding plate 114 moves by a width of the single slit 114a, as shown in FIG. 11(b), the spectrum of the measuring part 120a at the upper end to the spectrum of the measuring part 120a at a lower end of the object 120 are sequentially measured. Then, as shown in FIG. 11(c), by arranging the single slit 114a so that the measuring part 120a at the lower end of the object 120 is the object point and the single slit 114a provided on the shielding plate 114 is the image point, the spectrum is measured in the whole width of the object 120 in the vertical direction. As described above, even when the measuring parts in a scene are arranged in a direction differing from the moving direction, the spectrum of the scene can be measured by scanning the scene with single slit 114a.

Although scanning in which only the shielding plate 114 moves by the width of the single slit 114a is repeated in FIG. 10, scanning is not limited in such a manner and may be repeated so that the shielding plate 114, the collimator 115, the spectroscope 116, the imager 117 and the measuring unit 118 as a whole move with respect to the fixed single slit 114a.

However, even when such scanning is employed, during measurement of the spectrum of one scene, time for scanning of the single slit 114a is needed. Therefore, the spectrum of the scene that is shorter than the time necessary for scanning of the single slit 114a cannot be measured.

In particular, when the hyper spectrum sensor 100 is mounted on a mobile body such as the vehicle and movement is assisted based on a measurement result, measurement of the spectrum of one scene would be too late for the movement assistance. As a result, the movement assistance lacks precision.

Accordingly, it is an object of the present invention to provide a spectrum measuring apparatus that shortens the time necessary for measuring the spectrum of light from each of two or more different measuring parts that forms a measured object.

To achieve the above object, a spectrum measuring apparatus is provided with a slit group including two or more slits, a spectroscope that disperses the light extracted by the slit group for each of the slits, and a measuring unit that measures intensity of each component of light dispersed by the spectroscope for each of the slits. For a measured object including two or more different measuring parts, from light from the measured object, each of the slits extracts light from each of measuring parts;

In the spectrum measuring apparatus having such a structure, the spectrum of the light from each of the measuring parts can be measured without moving the slits. Thus, as compared to a structure in which the spectrum of the light from each of the measuring parts is measured while moving a single slit, time for measuring the spectrum can be shortened. Further, by mounting such a spectrum measuring apparatus on a mobile body, real-time spectrum measurement in the required moving state can be achieved. Thus, when assisting movement of the mobile body based on the spectrum measurement result, the accuracy of movement assistance can be improved.

The slit group is one of two or more different slit groups in the spectrum measuring apparatus. The spectrum measuring apparatus further includes a slit switch that allows switching of one slit group, which passes light that is to be dispersed to the spectroscope, between the two or more different slit groups.

When the measuring parts of the measured object differ in position, number, or the like, the light from such measuring parts also differ in position and amount. To extract such light from the light from the measured object, the slits in the slit group must also differ in position, number, or the like. In this regard, the spectrum measuring apparatus allows switching of one slit group, namely, the slit group used for measurement, between the two or more different slit groups. Thus, even when there are two or more different measured objects, if one of two or more different slit groups are applicable to each measured object, the spectrum of the measured objects can be measured. Thus, as compared to, for example, a structure including a single slit group, the degree of freedom in the attribute of the measuring parts, such as position and number of the measuring parts, can be increased.

The spectrum measuring apparatus further includes a slit controller that controls switching of the slit switch based on a control value that is in accordance with an attribute of the measuring parts.

In the spectrum measuring apparatus, the slit controller controls whether or not to change the slit group used for measurement with the slit switch or the switching to the slit group used for measurement based on the attribute of the measuring parts. Thus, even when there are a plurality of measured objects having different measuring part attributes, such as position and number of the measuring parts, spectrum measurement can be performed in real-time by the slit group suitable for the attribute of the measured part.

In the spectrum measuring apparatus, the slit controller determines the attribute of the measuring parts based on a distance between the measured object and the slit group.

A spatial range of the measured object becomes larger as the distance from the spectrum measuring apparatus to the measured object increases and conversely become smaller as the distance from the spectrum measuring apparatus to the measured object decreases. To effectively use such spatial range of the measured object, the measured part attribute, such as position and number of the measured part, is preferably varied in accordance with the spatial range of the measured object, that is, the distance from the spectrum measuring apparatus to the measured object.

For example, when the range of the measured objects becomes spatially large, if many measuring parts are scattered over a wide range in the measured object, the spectrum can be measured for the entire measured object, which is spatially wide, and measurement can be performed effectively using a spatially wide measured object. Conversely, when the range of the measured objects becomes spatially small, if spectrum measurement is performed in a small number of measuring parts, the measured object that is spatially restricted beforehand can be effectively measured.

In the spectrum measuring apparatus, the attribute of the measuring parts is determined by the slit controller based on the distance between the measured object and the slit group. In this structure, the changing of the slit group used for measurement is controllable based on the distance between the measured object and the slit group. Thus, spectrum measurement effectively using the range of the measured object as described above can be performed in real-time.

The measuring unit includes two or more light receiving elements that receive each component of the light dispersed by the spectroscope with each of the slits, and the spectrum measuring apparatus further includes a distance varying unit that allows varying of a distance between the spectroscope and the measuring unit.

The light dispersed by the spectroscope travels such that its cross-section is enlarged as the measuring unit becomes closer. Thus, the light receiving area light of the measuring unit becomes larger as the measuring unit moves away from the spectroscope and conversely becomes smaller as the measuring unit moves toward the spectroscope. The number of the light receiving elements receiving the dispersed light, that is, data amount of a measurement result, increases as the measuring unit moves away from the spectroscope and conversely decreases as the measuring unit moves toward the spectroscope. When the light receiving area of the measuring unit is small, more components enter the single light receiving element and decrease the resolution of the components. Conversely, when the light receiving area of the measuring unit becomes large, fewer components enter the single light receiving element and increase the resolution of the components.

The spectrum measuring apparatus further includes a distance controller that controls the varying of the distance varying unit based on a control value that is in accordance with an attribute of the slit group.

As mentioned above, the number of the light receiving elements receiving the dispersed light, that is, data amount of a measurement result, increases as the measuring unit moves away from the spectroscope and conversely decreases as the measuring unit moves toward the spectroscope. To keep the data amount of the measurement data at a certain amount or less, it is preferable that the number of light receiving elements used to measure intensity be kept at a certain number or less.

For example, when the distance between adjacent slits becomes shorter, the distance between light fluxes received by the measuring unit also becomes shorter. This increases the number of light receiving elements that receive such light fluxes. In this case, when the distance between the spectrometer and the measuring unit becomes short, the number of light receiving elements increased in this manner can be reduced, and the data amount of the measurement data can be kept at a certain amount. Further, when the distance between adjacent slits becomes longer, the distance between light fluxes received by the measuring unit also becomes longer. This decreases the number of light receiving elements that receive such light fluxes. In this case, when the distance between the spectrometer and the measuring unit becomes long, the number of light receiving elements decreased in this manner can be increased, and the data amount of the measurement data can be kept at a certain amount.

To maintain the resolution of each component at a certain value or greater, it is preferable that the number of light receiving elements used to measure intensity be kept at a certain number of greater. As mentioned above, when the distance between adjacent slits becomes longer, the distance between light fluxes received by the measuring unit also becomes longer. This decreases the number of light receiving elements that receive such light fluxes. In this case, when the distance between the spectrometer and the measuring unit becomes long, the number of light receiving elements decreased in this manner can be increased, and the number of components received by a single light receiving element can be reduced.

In the spectrum measuring apparatus, the distance controller controls whether or not to increase the distance between the spectrometer and the measuring unit or whether or not the decrease the distance between the spectrometer and the measuring unit with the changing performed by the distance varying unit. In such a structure, even when there are a plurality of slit groups having different attributes, such as the distance between adjacent slits and the number of slits, the distance between the spectrometer and the measuring unit is controllable based on the attribute of the slit group. Thus, the data amount can be adjusted and the component resolution can be adjusted as described above.

The spectrum measuring apparatus further includes a band-pass filter that guides only a wavelength component in a measuring band to the spectroscope.

For example, in the light passed through each of the plurality of slits, when the wavelength components in the measuring band and the wavelength components outside the measuring band interfere with each other, the measuring accuracy of the measuring unit may be lowered. However, in the spectrum measuring apparatus, only the wavelength components in the measuring band are guided to the spectroscope. Thus, in the light passed through each of the slits, interference between light outside the measuring band and light in the measuring band can be avoided in the subsequent stage of the spectroscope. This allows the accuracy relating to the intensity of each component and, consequently, the accuracy of the spectrum to be improved. Further, since the spectroscope and the measuring unit do not require a structure for suppressing interference, structures of the spectroscope and the measuring unit are simplified.

In the spectrum measuring apparatus, the band-pass filter is configured so that the measuring band narrows as an interval between adjacent ones of the slits shortens.

When the interval between the adjacent slits is shorter, the interval between light fluxes passed through the slits is also shorter. For example, in comparison to when the interval between the adjacent slits is longer, each component dispersed by the spectrometer may easily cause interference in a preceding stage of the spectroscope. However, in the spectrum measuring apparatus, the measuring band narrows as an interval between adjacent ones of the slits shortens. This suppresses the above-mentioned interference.

In the spectrum measuring apparatus, each of the two or more slits includes an optical element that converts light passed through the slits into converged light or collimated light.

When the interval between the adjacent slits is shorter, the interval between light fluxes passed through the slits also narrows. Thus, the light flux passed through a slit may interfere with the light flux passed through another adjacent slit in a preceding stage of the spectroscope. However, in the spectrum measuring apparatus, the optical element of each slit converts light passed through the slits into converged light or collimated light. This suppresses the above-mentioned interference.

In the spectrum measuring apparatus, the two or more slits in the slit group are eccentric in their arrangement direction.

In the spectrum measuring apparatus, two or more slits are eccentric in their arrangement direction. Thus, spectrum measurement can be performed in real-time on the measured object, which is formed by two or more different and eccentric measuring parts.

In the spectrum measuring apparatus, two or more different slit groups differ from each other in number of the slits.

In the spectrum measuring apparatus, two or more different slit groups differ from each other in number of the slits. Thus, spectrum measurement can be performed in real-time on two or more measured objects, which differ from each other in number of measuring parts.

The spectrum measuring apparatus is mounted on a mobile body.

The characteristics of light received by a mobile body from its surrounding changes depending on the characteristics of the light irradiated in the surrounding and, in particular, depending on the optical characteristics of the surrounding that receives such light. The light irradiating the surrounding of the mobile body and the situation of the surrounding of the mobile body, such as the elements forming the surrounding of the mobile body, differ whenever the mobile body moves. The spectrum measuring apparatus performs spectrum measurement in rear-time so that the spectrum of the light from the surrounding of the mobile body is in correspondence with the movement of the mobile body.

BRIEF DESCRIPTION OF THE DRAWINGS

FIGS. 11(a), (b) and (c) are diagrams showing one example of scanning of a single slit provided on a shielding plate and its optical action when a mobile body such as a vehicle is provided with the hyper spectrum sensor as the conventional spectrum measuring apparatus.

DETAILED DESCRIPTION OF THE PREFERRED EMBODIMENTS

First Embodiment

Figure 1:
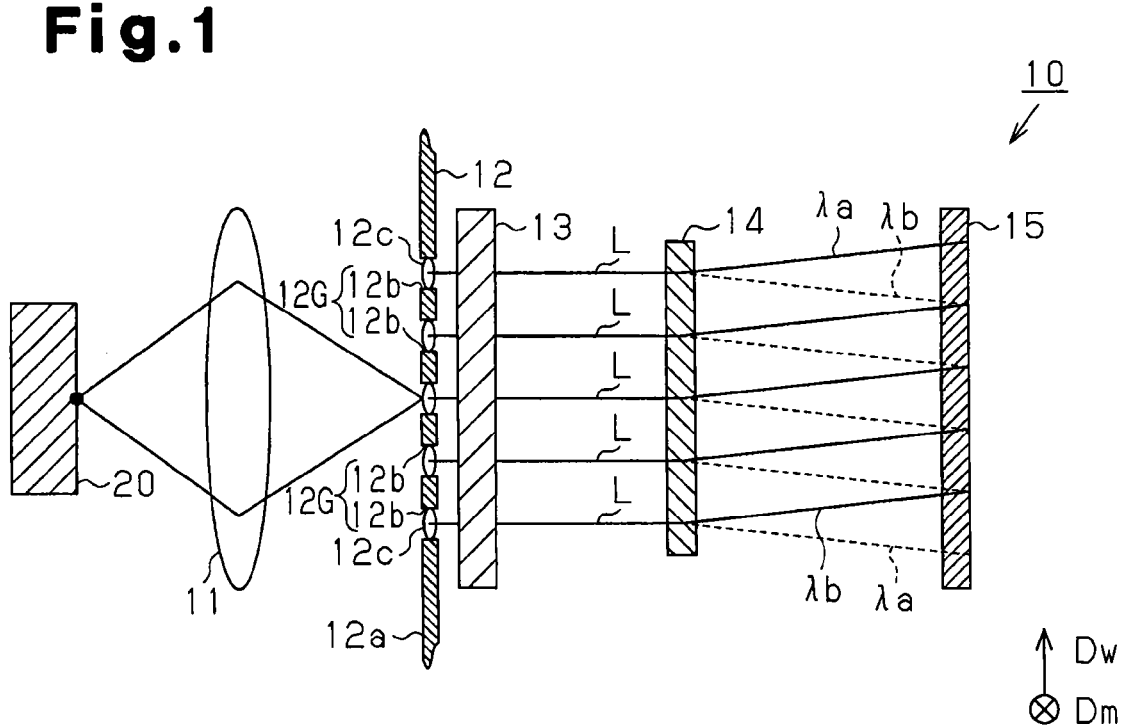
FIG. 1 is a diagram showing an optical structure in a spectrum measuring apparatus according to a first embodiment of the present invention.

A spectrum measuring apparatus according to a first embodiment of the present invention will now be described in detail with reference to FIG. 1. First, referring to FIG. 1, the optical structure of a spectrum measuring apparatus 10 in the present embodiment will be described.

In the spectrum measuring apparatus 10, a condenser 11, a shielding unit 12, a band-pass filter 13, a spectroscope 14, and a measuring unit 15 are arranged in this order along a traveling direction of light from a measured object 20. Each of the elements forming the spectrum measuring apparatus 10 is configured so that optical characteristics are continuous in one direction intersecting a hypothetical light beam representing a light flux that passes the elements, that is, an optical axis (extending in a lateral direction in FIG. 1). In other words, the elements forming the spectrum measuring apparatus 10 extends in a direction perpendicular to the plane of FIG. 1.

The condenser 11 is an optical system formed by an optical element such as a lens for condensing or converging light emitted by the measured object 20 or light reflected on the measured object 20, that is, light from the measured object 20, without any loss, and has a function of orienting the condensed light to the shielding unit 12 as an optical element in a subsequent stage.

The shielding unit 12 includes a shielding plate 12a having a part for shielding a portion of light from the condenser 11 against the band-pass filter 13 as an optical element in a subsequent stage and a part for allowing a remaining portion of the light from the condenser 11 to pass to the band-pass filter 13. The part for allowing the light to pass in the shielding plate 12a includes a slit group 12G having two or more slits 12b. Each of the two or more slits 12b forming the slit group 12G is an aperture extending in one direction intersecting the light traveling direction (a longitudinal direction Dm of the slits 12b) such as a direction perpendicular to the plane of FIG. 1. The two or more slits are arranged at regular intervals in the other direction intersecting the light traveling direction (a width direction Dw of the slits 12b) such as a vertical direction in FIG. 1. Each of the slits 12b forming the slit group 12G has an optical element 12c such as a collimating lens for converting light passed therethrough into collimated light at each slit 12b or a converting lens for converting light passed therethrough into converged light at each slit 12b. That is, the shielding unit 12 has a function of orienting a portion of the light from the condenser 11 as the collimated light or the converged light at each slit 12b to the band-pass filter 13 as an optical element in a subsequent stage.

The band-pass filter 13 is a filter that has a high transmittance for light within a measuring band as a specific band and a low transmittance for light in a band other than the measuring band. The measuring band described herein refers to a wavelength band previously set in order to distinguish the measured object 20, for example, a band that contains a visible band as well as an invisible band and includes a unique wavelength forming light from a distinguishing object. The band-pass filter 13 has a function of orienting the light passed through the slit group 12G as light at each slit 12b to the spectroscope 14 as an optical element in a subsequent stage.

The spectroscope 14 is a spectral system for dispersing the light within the measuring band into wavelength components as continuous components. The spectroscope 14 disperses each light L at each slit 12b into wavelength components (wavelength component λa to wavelength component λb) in the width direction Dw of the slits 12b and orients the components as the light L at each slit 12b to the measuring unit 15 as an optical element in a subsequent stage.

The measuring unit 15 is a CCD image sensor or a CMOS image sensor in which light receiving elements are arranged in two directions orthogonal to the optical axis of the spectroscope 14, that is, the longitudinal direction Dm and the width direction Dw of the slits 12b. The measuring unit 15 is arranged so that the different wavelength components corresponding to the slits 12b enter the different light receiving elements in the width direction Dw of the slits 12b. The measuring unit 15 is also arranged so that light from different positions on the measured object 20 enter different light receiving elements in the longitudinal direction Dm of the slits 12b.

In the spectrum measuring apparatus 10 having such structure, the light from each part of the measured object 20 first enters the condenser 11. The light entering the condenser 11 are condensed by the condensing action of the condenser 11 and sent toward the shielding unit 12, and only the light sent toward the slit group 12G passes through each of the optical element 12c by the action of the shielding unit 12. In this manner, the light extracted by the slit group 12G are converted into collimated light or converged light by the optical action of the optical element 12c and are guided to the band-pass filter 13. In the light entering the band-pass filter 13, only the light within the measuring band is guided to the spectroscope 14 by the filtering action of the band-pass filter 13 and is dispersed into the wavelength component λa to the wavelength component λb by the spectral action of the spectroscope 14. In this embodiment, the band-pass filter 13 allows passage of light having a wavelength in the wavelength band of 400 nm to 2500 nm to pass. The wavelength components for the slits 12b, which are dispersed by the spectroscope 14, are received by the light receiving elements of the measuring unit 15, which correspond to the slits 12b.

In other words, in the spectrum measuring apparatus 10, the light from the linear measuring parts extending in the longitudinal direction Dm among the light that can be condensed from the measured object 20 by the condenser 11 are extracted through the slits 12b. Since the two or more slits 12b having this function are arranged in the width direction Dw, the light from the two or more measuring parts arranged in the width direction Dw are extracted at the same timing. Therefore, the spectrum measuring apparatus 10 having such structure measures the spectrum of the light from the two or more different measuring parts extending in the longitudinal direction Dm at the same timing.

Here, as described above, when the conventional hyper spectrum sensor 100 shown in FIG. 11 measures the spectrum in one scene as the object 120, at least time for scanning of one measuring part 120a corresponding to the single slit 114a over the whole range of the object 120 is needed. For example, one movement of the single slit 114a requires 0.033 seconds, and the spectrum of one scene is measured by movement of the single slit 114a of 400 times. This results in that spectrum measurement of one scene taking about 13 seconds. Thus, in order to measure the spectrum in one scene, the hyper spectrum sensor 100 and the object 120 must relatively stay still for about 13 seconds. If the spectrum measuring apparatus 10 of this embodiment were to include 400 slits 12b, the above-mentioned scanning of the slit becomes unnecessary and, thus, the spectrum of each measuring part contained in one scene can be measured in real time. Further, even in a structure that does not have 400 slits 12b, as long as the two or more slits 12b are included, the number of times of scanning of the slits 12b can be reduced, thereby shortening time necessary for spectrum measurement.

If the slit group 12G does not perform scanning in the spectrum measuring apparatus 10, the spatial resolution of the measured object 20 corresponds to the number of slits 12b forming the slit group 12G. The wavelength resolution of the measured object 20 corresponds to the number of light receiving elements arranged in the width direction Dw among the light receiving elements receiving the light L from one slit 12b.

For example, the measuring unit 15 in the spectrum measuring apparatus 10 may include light receiving elements arranged in a matrix in the longitudinal direction Dm and the width direction Dw, 300 light receiving elements provided in the longitudinal direction Dm, and 300 light receiving elements provided in the width direction Dw. In such a case, when the number of the slits 12b forming the slit group 12G in such structure is five, each of the five measuring parts is hypothetically divided into 300 regions in the longitudinal direction Dm. The spectrum of light from the measured object 20 is dispersed into the spectrum of the light from 5×300 spaces. Further, since the number of the light receiving elements arranged in the width direction Dw among the light receiving elements receiving the light L from one slit 12b becomes 300/5=60, the spectrum of the light from each of the measuring parts forming the measured object 20 is formed by 60 wavelength components.

Therefore, by changing the number of slits 12b forming the slit group 12G, the spatial resolution of the measured object 20 can be changed. Further, by changing the number of the light receiving elements arranged in the width direction Dw among the light receiving elements receiving the light L from one slit 12b, the wavelength resolution of the measured object 20 can be changed.

As described above, the spectrum measuring apparatus in the first embodiment has the advantages listed below.

(1) The spectrum measuring apparatus 10 includes the slit group 12G having the two or more slits 12b for extracting the light from each of the two or more different measuring parts of the measured object 20. The spectrum measuring apparatus 10 further includes the spectroscope 14 for dispersing the light extracted by the slit group 12G at each slit 12b and the measuring unit 15 for measuring the intensity of each of the wavelength components corresponding to the respective slits 12b, which are dispersed by the spectroscope 14. Thus, the spectrum of the light from each of the measuring parts can be measured without moving the slits 12b with respect to the measured object 20 including the two or more different measuring parts. Thus, as compared to the structure in which the spectrum of the light from each of the measuring parts is measured while moving a single slit, time for measuring the spectrum can be shortened. Further, even when the slits 12b are moved, as long as the two or more slits 12b are included, the number of times of movement can be reduced as compared to the case of moving the single slit and therefore, time required to measure the spectrum can be shortened.

(2) Furthermore, since the spectrum of the light from the measuring parts is measured at the same timing, the spectrum over a wide range of the measured object 20 can be measured in real time. Mounting of the spectrum measuring apparatus 10 on the mobile body can realize real-time spectrum measurement in the required moving state. Thus, by assisting movement of the mobile body based on the spectrum measurement result, the accuracy of movement assistance can be improved.

(3) The spectrum measuring apparatus 10 includes the band-pass filter 13 for guiding only the wavelength components in the measuring band to the spectroscope 14. In the light passed through each of the plurality of slits 12b, when the wavelength components in the measuring band and the wavelength components outside the measuring band interfere with each other, the measuring accuracy of the measuring unit 15 may be lowered. In this embodiment, since the band-pass filter 13 guides only the wavelength components in the measuring band to the spectroscope 14, in the light passed through each of the slits 12b, interference between light outside the measuring band and light in the measuring band can be avoided in the subsequent stage of the spectroscope 14. Therefore, the accuracy relating to the intensity of each component and, consequently, the accuracy of the spectrum can be improved. Furthermore, since the spectroscope 14 and the measuring unit 15 do not require a structure for suppressing interference, structures of the spectroscope 14 and the measuring unit 15 are simplified.

(4) Each of the two or more slits 12b in the spectrum measuring apparatus 10 includes the optical element 12c for converting the light passed through the slit 12b into the converged light or the collimated light. When the interval between the adjacent slits 12b is shorter, the interval between light fluxes passed through the slits 12b is also shorter. Thus, the light flux passed through one slit 12b easily interfere with the light flux passed through another slit 12b adjacent to the one slit 12b in the preceding stage of the spectroscope 14. In this embodiment, since the optical element 12c of each of the slits 12b converts the light passed through the slit 12b into the converged light or the collimated light, such interference can be suppressed.

Second Embodiment

A spectrum measuring apparatus according to a second embodiment of the present invention will now be described with reference to FIGS. 2 and 3. The second embodiment includes a shielding unit 12 that is different from that of the first embodiment and further includes a slit switch 22 and a matching unit 23. Otherwise the basic structure is the same as that of the first embodiment. Thus, only the differences will be described below in detail.

Figure 2:
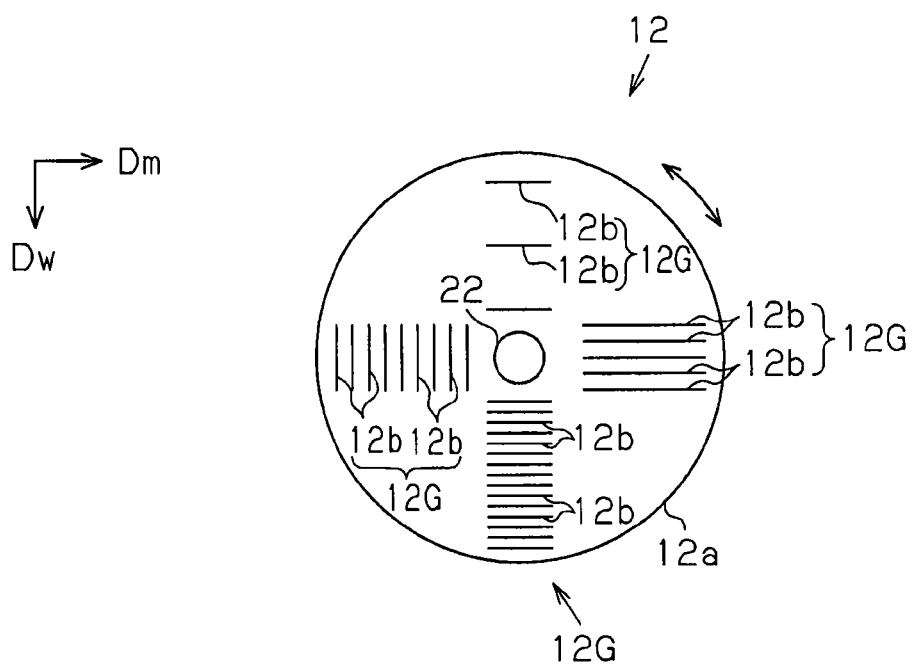
FIG. 2 is a plan view showing the structure of a shielding plate in a spectrum measuring apparatus according to a second embodiment of the present invention.

As shown in FIG. 2, four slit groups 12G radially extending from the center of the disk-shaped shielding plate 12a forming the shielding unit 12 are arranged at regular intervals in the circumferential direction of the shielding plate 12a. The four slit groups 12G are different from one another in number, interval, and orientation of the slits 12b forming the slit groups 12G. More specifically, in three slit groups 12G (the slit groups 12G on the upper side, the left side and the lower side in FIG. 2) of four slit groups 12G, the two or more slits 12b extending in a direction orthogonal to the radial direction of the shielding plate 12a are arranged at regular intervals in the radial direction. The three slit groups 12G are different from one another in number and interval of the slits 12b. In one slit group 12G (the slit group 12G on the right side in FIG. 2) that differs from the other three slit groups 12G, the two or more slits 12b extending substantially in the radial direction of the shielding plate 12a are arranged at regular intervals in a direction orthogonal to the radial direction.

The slit switch 22, which can rotate the shielding plate 12a in 90 degree intervals in the circumferential direction of the shielding plate 12a about an axis of the shielding plate 12a, is coupled to the center of the shielding plate 12a. By rotating the shielding plate 12a, the slit switch 22 switches one slit group for allowing the light L to transmit the spectroscope 14 for light dispersion, that is, the measuring slit group 12G, among the four slit groups 12G.

Figure 3:
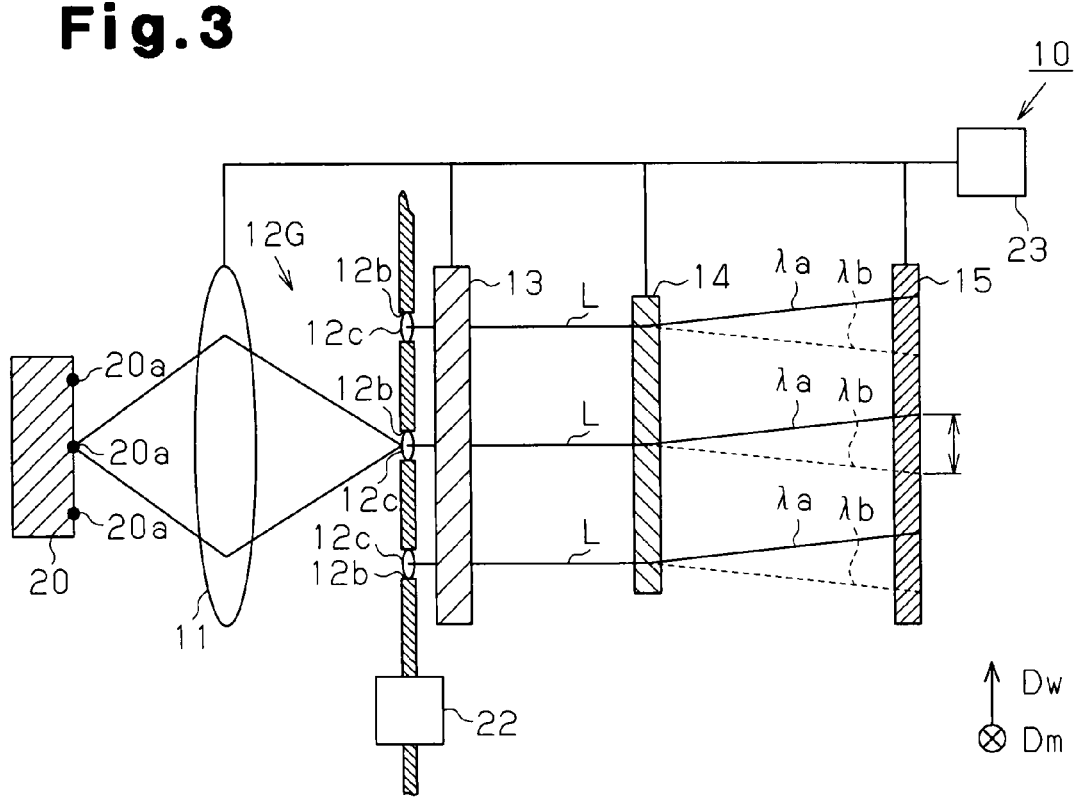
FIG. 3 is a diagram showing an optical structure in the spectrum measuring apparatus according to the second embodiment of the present invention.

As shown in FIG. 3, the condenser 11, the band-pass filter 13, the spectroscope 14, and the measuring unit 15 are coupled to the matching unit 23, which can rotate each of these elements in forward and rearward directions about the optical axis in a movable range of 90 degrees. When the slit group 12G (the slit group 12G on the right side in FIG. 2) having the slits 12b extending substantially in the radial direction of the shielding plate 12a is the slit group 12G used for measuring, the matching unit 23 rotates each of the above-mentioned elements in the forward direction about the optical axis by 90 degrees. In this state, when the slit group 12G (the slit group 12G on the upper side, the left side or the lower side in FIG. 2) having the slits 12b extending in the direction orthogonal to the radial direction of the shielding plate 12a becomes the slit group 12G used for measuring, the matching unit 23 rotates each of the above-mentioned elements in the rearward direction about the optical axis by 90 degrees. That is, the matching unit 23 rotates each of the condenser 11, the band-pass filter 13, the spectroscope 14 and the measuring unit 15 so that the direction in which the optical characteristics in each of the condenser 11, the band-pass filter 13, the spectroscope 14 and the measuring unit 15 are continuous matches the long axis direction of the slits 12b.

When the slit group 12G having n slits 12b (n=3 in FIG. 3) (n=3 in the slit group 12G on the upper side in FIG. 2) becomes the slit group 12G used for measuring, light from measuring parts 20a at n points corresponding to the n slits 12b are extracted by the slits 12b at the same timing. Therefore, the spectrum measuring apparatus 10 having such structure measures the spectrum of the light from the measuring parts 20a at n points at the same timing.

Here, when the measuring parts 20a of the measured object 20 vary with each other in position, number, and the like, the light from the measuring parts 20a vary with each other in position and amount. In order to extract such light from the light from the measured object 20, the slits 12b of the slit group 12G must vary with each other in position, number, and the like. In the spectrum measuring apparatus 10 in this embodiment, the slit switch 22 switches the slit group 12G used for measuring to any of the four different slit groups 12G. Thus, even if the two or more different measuring parts 20a are measured, when the four slit groups 12G are switched and one becomes applicable to the measured object 20, spectrum measurement can be achieved.

As described above, the spectrum measuring apparatus 10 of the second embodiment has the advantages listed below in addition to advantages (1) to (4) of the first embodiment.

(5) The spectrum measuring apparatus 10 includes the four different slit groups 12G and the slit switch 22. The slit switch 22 can switch the slit group 12G used for measuring to any of the four different slit groups 12G. That is, the slit group 12G for measuring can be switched to any of the four different slit groups 12G by the slit switch 22. Thus, even when two or more different measured objects 20 are measured, spectrum measurement can be achieved by applying any of the four different slit groups 12G to each measured object 20. In this embodiment, as compared to the structure including the single slit group 12G, the degree of freedom in the attribute of the measuring parts 20a such as position and the number of the measuring parts 20a can be increased.

(6) In the spectrum measuring apparatus 10, the three slit groups 12G (the slit groups 12G on the upper side, the left side and the lower side in FIG. 2) are different from one another in the number of slits 12b. In such a structure, since the different slit groups 12G having different number of slits 12b can be used in the single spectrum measuring apparatus 10, the spatial resolution can be switched in the same spectrum measuring apparatus 10.

(7) When the interval between adjacent slits 12b becomes shorter, the interval between the light fluxes from the adjacent slits 12b also becomes shorter. Further, when the measuring band becomes wider as the band-pass filter 13 changes, the width direction Dw of dispersed light also becomes wider. Thus, for example, when the interval between adjacent slits 12b is fixed even though the width of the dispersed light in the width direction Dw increases, the light from adjacent slits may interfere with each other in the subsequent stage of the spectroscope 14. In the spectrum measuring apparatus 10 of this embodiment, the interval between adjacent slits 12b can be switched. This suppresses the above-described interference.

(8) The three slit groups 12G (on the upper side, the left side, and the lower side in FIG. 2) of the spectrum measuring apparatus 10 are different from the remaining one slit group 12G (on the right side in FIG. 2) in the long axis direction of the slits 12b with respect to the measured object 20. The matching unit 23 rotates each of the condenser 11, the band-pass filter 13, the spectroscope 14, and the measuring unit 15 so that the direction in which the optical characteristics in each of the condenser 11, the band-pass filter 13, the spectroscope 14 and the measuring unit 15 are continuous matches the long axis direction of the slits 12b. In such a structure, the slit groups 12G having the different long axis directions of the slits 12b can be used in the single spectrum measuring apparatus 10. In other words, in the single spectrum measuring apparatus 10, the long axis direction of the measuring part 20a can be switched.

Third Embodiment

A spectrum measuring apparatus according to a third embodiment of the present invention will now be described with reference to FIG. 4. The fourth embodiment includes a distance varying unit 24. Otherwise, the basic structure is the same as that of the first embodiment. Thus, only the differences will be described below in detail.

Figure 4:
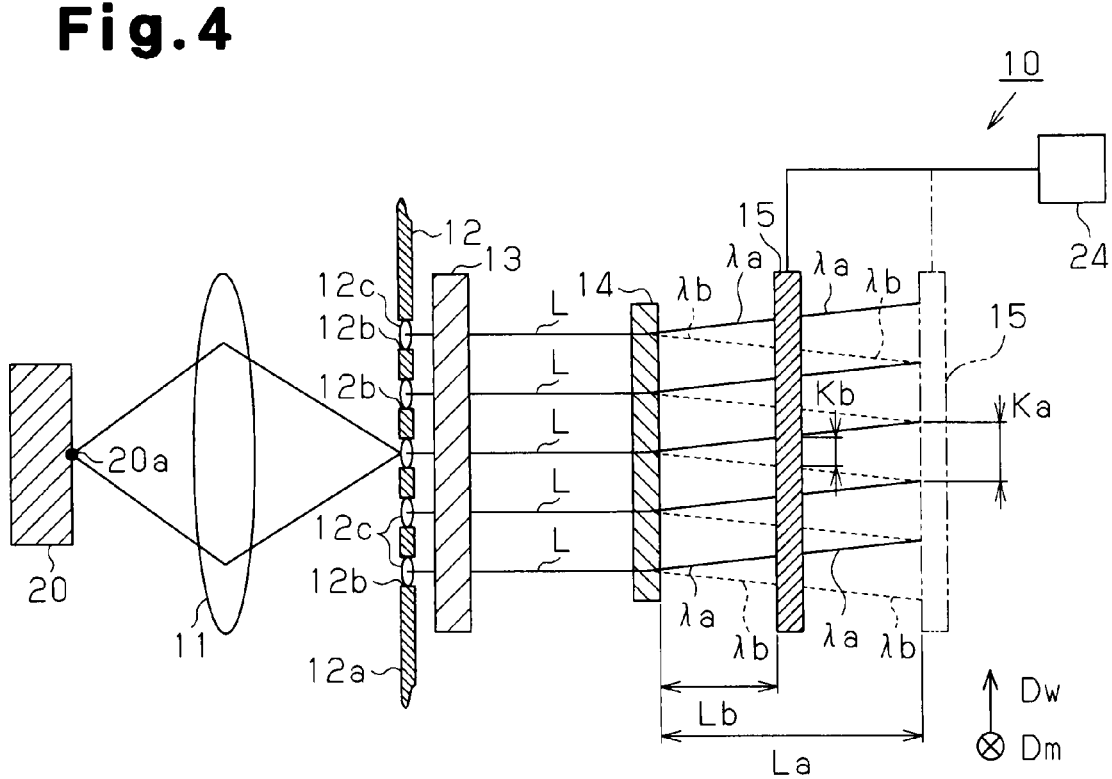
FIG. 4 is a diagram showing an optical structure of a spectrum measuring apparatus according to a third embodiment the present invention.

As shown in FIG. 4, the distance varying unit 24, which can vary the distance between the spectroscope 14 and the measuring unit 15, is coupled to the measuring unit 15 of the spectrum measuring apparatus 10. Due to the distance varying unit 24, the measuring unit 15 is movable along the direction of the optical axis between a position at which the measuring unit 15 is farthest from the spectroscope 14 (position indicated by a double-dashed line in FIG. 4) and a position at which the measuring unit 15 is closest to the spectroscope 14 (position indicated by a solid line in FIG. 4). The position at which the measuring unit 15 is farthest from the spectroscope 14 is set under the condition that the wavelength components $\lambda a$, $\lambda b$ from one slit 12b do not interfere with the wavelength component $\lambda a$, $\lambda b$ from another adjacent slit 12b in the preceding stage of the light receiving element.

Here, the light dispersed by the spectroscope 14 advances so that its cross section extends toward the measuring unit 15 in the width direction Dw. Accordingly, a light receiving area of the measuring unit 15 becomes larger as the measuring unit 15 moves away from the spectroscope 14 and conversely becomes smaller as the measuring unit 15 moves close to the spectroscope 14. The number of the light receiving elements receiving the dispersed light, that is, data amount of a measurement result, becomes larger as the measuring unit 15 moves away from the spectroscope 14 and becomes smaller as the measuring unit 15 moves toward the spectroscope 14. When the light receiving area of the measuring unit 15 is small, more wavelength components enter the single light receiving element and decrease the resolution of the wavelength components. When the light receiving area of the measuring unit 15 is large, less wavelength components enter the single light receiving element and increases the resolution of the wavelength components.

For example, when the distance between the measuring unit 15 and the spectroscope 14 is extended to a first distance La, the number of the light receiving elements receiving the light from one slit 12b in the width direction Dw is defined as a first element number ka. When the distance between the measuring unit 15 and the spectroscope 14 is shortened to a second distance Lb, the number of the light receiving elements receiving the light from one slit 12b in the width direction Dw is defined as a second element number kb. The number of the light receiving elements in the second distance Lb, that is, the second element number kb is smaller than the number of the light receiving elements in the first distance La, that is, the first element number ka, in accordance with the decreased light receiving area of the measuring unit 15. In this case, since more wavelength components enter the light receiving elements forming the second element number kb than the light receiving elements forming the first element number ka, the resolution of the wavelength components of each light receiving element forming the second element number kb decreases.

In this manner, by moving the measuring unit 15 to shorten the distance between the spectroscope 14 and the measuring unit 15, the data amount of the spectrum can be decreased while maintaining the number of slits 12b, that is, the spatial resolution of the measured object 20. In contrast, by moving the measuring unit 15 to extend the distance between the spectroscope 14 and the measuring unit 15, the resolution of the wavelength components can be improved while maintaining the number of slits 12b, that is, the spatial resolution of the measured object 20.

As described above, the spectrum measuring apparatus 10 in the third embodiment has the advantages listed below in addition to advantages (1) to (4) of the first embodiment.

(9) The spectrum measuring apparatus includes the distance varying unit 24 that can vary the distance between the spectroscope 14 and the measuring unit 15. Thus, the distance between the spectroscope 14 and the measuring unit 15 can be varied by the distance varying unit 24. Thus, for example, as compared to the structure in which the distance between the spectroscope 14 and the measuring unit 15 is fixed, the degree of freedom in the data amount of the spectrum measuring result and the resolution of each wavelength component can be increased.

Fourth Embodiment

A spectrum measuring apparatus according to a fourth embodiment of the present invention will now be described with reference to FIGS. 5 and 6. The fourth embodiment includes a shielding unit 12 and a band-pass filter 13, which differ from those of the first embodiment. Otherwise, the basic structure is the same as that of the first embodiment. Thus, only the differences will be described below in detail.

Figure 5:
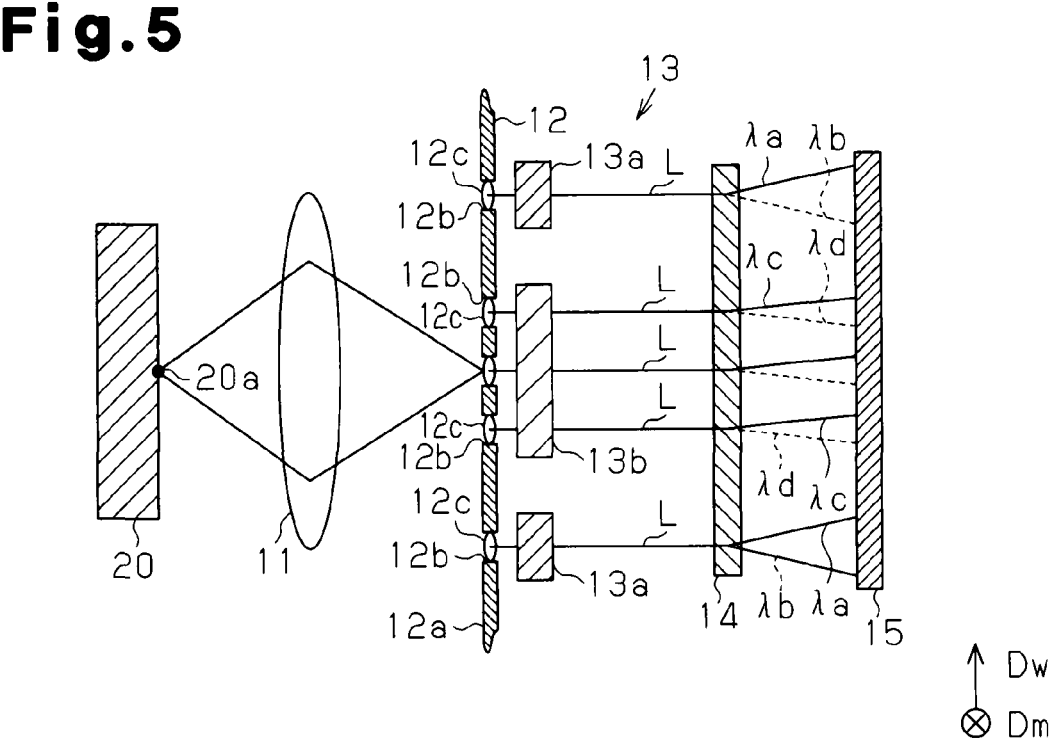
FIG. 5 is a diagram showing an optical structure of a spectrum measuring apparatus according to a fourth embodiment the present invention.

As shown in FIG. 5, in the shielding unit 12 of the spectrum measuring apparatus 10, three slits 12b are eccentrically arranged substantially at the center in the width direction Dw, which is the arrangement direction of the slits 12b. Further, two slits 12b that sandwich the three slits 12b therebetween are arranged at opposite ends of the shielding unit 12 in the width direction Dw of. The five slits 12b are arranged so that an interval between the three slits 12b eccentrically located at the center in the width direction Dw is shorter than an interval from the slits 12b at the two ends in the width direction Dw to the three slits 12b.

The band-pass filter 13 includes two first band-pass filters 13a for receiving light from the slits 12b at the both ends in the width direction Dw and a second band-pass filter 13b for receiving light from the three slits 12b that are eccentric at the center in the width direction Dw. A band in which the first band-pass filters 13a has a high transmittance (wavelength component $\lambda a$ to wavelength component $\lambda b$) is configured so as to contain a band in which the second band-pass filters 13b has a high transmittance (wavelength component $\lambda c$ to wavelength component $\lambda d$) and to be wider than the wavelength component $\lambda c$ to wavelength component $\lambda d$. In other words, the band-pass filter 13 is configured so that as the interval between adjacent slits 12b becomes shorter, the measuring band becomes narrower.

Here, as described above, the light dispersed by the spectroscope 14 advances so that its cross section extends toward the measuring unit 15 in the width direction Dw. Accordingly, the light receiving area of the measuring unit 15 becomes larger as a transmission band of the band-pass filter 13 widens and becomes smaller as the transmission band of the band-pass filter 13 narrows. When the interval between adjacent slits 12b becomes shorter, an interval between the light passed through the slits 12b also automatically becomes shorter. Conversely, when the interval between adjacent slits 12b becomes longer, the interval between light passed through the slits 12b also automatically becomes longer.

In this embodiment, the wavelength band of the light L passed through the second band-pass filters 13b is narrower than the wavelength band of the light L passed through the first band-pass filters 13a. Thus, for the light receiving area of the measuring unit 15, the light receiving area of the light passed through the second band-pass filters 13b is smaller than the light receiving area of the light passed through the first band-pass filters 13a. An interval between the light L passed through the second band-pass filters 13b and the adjacent light L becomes relatively shorter in correspondence with the interval between corresponding slits 12b. An interval between the light L passed through the first band-pass filters 13a and the adjacent light L becomes relatively longer in correspondence with the interval between corresponding slits 12b. Thus, by narrowing the measuring band with the band-pass filter 13 as the interval between adjacent slits 12b becomes shorter, interference between light from the adjacent slits 12b can be suppressed in the light receiving elements of the measuring unit 15 or the preceding stage of the measuring unit 15.

In addition, the number of the light receiving elements receiving the light L passed through the first band-pass filters 13a is larger than the number of the light receiving elements receiving the light L passed through the second band-pass filters 13b. That is, the resolution of the wavelength components is high for the measuring parts corresponding to the long interval between adjacent slits 12b, the resolution of the wavelength components is low for the measuring parts corresponding to the short interval between adjacent slits 12b. Accordingly, when the optical characteristics, that is, the measuring parts of which physical properties should be measured in detail, can be identified in advance in the measured object 20, it is preferred that the slits 12b having a long interval therebetween by arranged for the measuring parts. In such a structure, the spectrum having a high resolution of the wavelength components for the optical characteristics, that is, the measuring parts of which physical properties should be measured in detail, can be measured.

Figure 6:
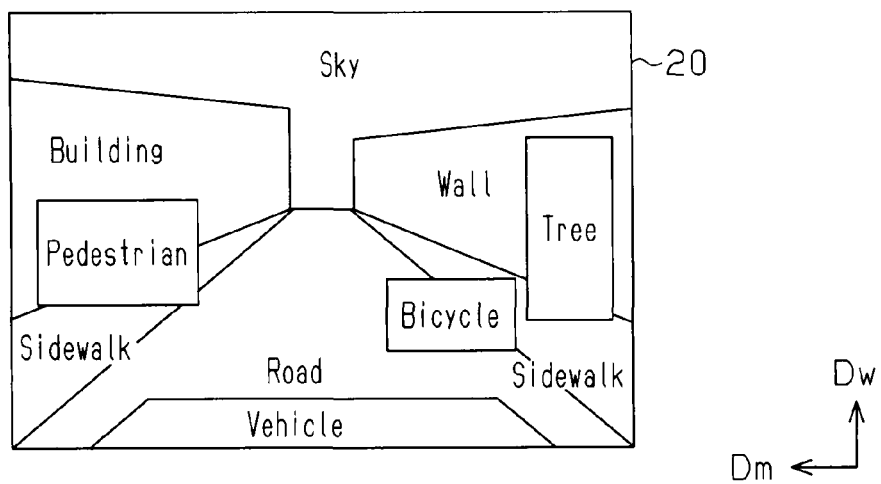
FIG. 6 is a diagram showing one example of a measured object in the spectrum measuring apparatus according to the fourth embodiment of the present invention.

For example, as shown in FIG. 6, a road, a sidewalk, a building, a wall, the sky, a tree (roadside tree), a bicycle, and a bonnet of a vehicle are observed around the front of the vehicle when viewed from the inside of the vehicle driven along a road. In the vicinity of the front of the vehicle, a pedestrian, a bicycle, and the like, which required vehicle driving assistance, are generally observed in the region between the bonnet of the vehicle and the sky. When the surrounding at the front of the vehicle is the measured object 20 and the spectrum measuring apparatus 10 is mounted on the vehicle, with the following structure, the spectrum having both of the high spatial resolution and high resolution of the wavelength components for the measuring parts such as the pedestrian and the bicycle can be measured.

Here, it is assumed that the direction from the bonnet of the vehicle toward the sky is the width direction Dw, and the slit group 12G is configured so that the interval between adjacent slits 12b becomes relatively shorter around the center of the width direction Dw of the measured object 20 (refer to FIG. 5). In such a structure, the spatial resolution is high around the center of the measured object 20 and the resolution of the wavelength components is high around both ends of the measured object 20 in the width direction Dw. Thus, when the pedestrian, the bicycle, and the like exist near the center of the measured object 20, that is, the object necessary for the driving assistance exists far away from the vehicle, first, its spatial characteristics can be measured with the high spatial resolution. When the object necessary for the driving assistance exists around both ends of the measured object 20 in the width direction Dw, that is, the object necessary for the driving assistance exists near the vehicle, its optical characteristics can be measured with the high resolution of the wavelength components.

Thus, even when the slit group 12G is not switched in the shielding unit 12, the object that is far away from the vehicle can be distinguished with the high spatial resolution. The object near the vehicle can be distinguished with the high resolution of the wavelength components. Therefore, an object that is far away from the vehicle can be spatially distinguished to determine whether or not driving assistance is necessary. An object near the vehicle can be distinguished to determine whether it is a pedestrian, an animal, or a bicycle.

As described above, the spectrum measuring apparatus 10 in the fourth embodiment has the advantages listed below in addition to advantages (1) to (4) of the first embodiment.

(10) In the slit group 12G of the spectrum measuring apparatus 10, two or more slits 12b are eccentric in the arrangement direction. Thus, the spectrum from the measured object 20, including two or more different measuring parts, can be measured in real time.

(11) At the measuring parts corresponding to the two or more eccentric slits 12b, the spatial resolution of the measured object 20 can be improved. Conversely, at the measuring parts corresponding to the slits 12b other than the eccentric slits 12b, the spatial resolution of the measured object 20 can be suppressed. Accordingly, one spectrum measuring apparatus 10 can set a plurality of spatial resolutions of the measured object 20 without requiring switching of the slit group 12G.

(12) The spatial resolution can be improved at the two or more eccentric measuring parts, while the resolution of the wavelength components can be improved at the measuring parts excluding the eccentric measuring parts. Thus, one measured object 20 may include a part of which the spectrum can be measured with the high spatial resolution and a part of which the spectrum can be measured with the high resolution of the wavelength component.

(13) The band-pass filter 13 in the spectrum measuring apparatus 10 is configured so that as the interval between adjacent slits 12b becomes shorter, the measuring band is becomes narrower. Thus, even when the interval between adjacent slits 12b is shortened due to eccentricity, interference between light passed through the slits can be suppressed.

Fifth Embodiment

A spectrum measuring apparatus according to a fifth embodiment of the present invention will now be described with reference to FIGS. 7 and 8. In the fifth embodiment, the spectrum measuring apparatus 10 is mounted on a vehicle. Otherwise, the basic structure is similar to that of the above embodiments. Thus, only the differences will be described below.

The spectrum measuring apparatus 10 in this embodiment includes the shielding unit 12 and the slit switch 22, which are described in second embodiment, and the distance varying unit 24 described in the third embodiment.

The spectrum measuring apparatus 10 in this embodiment includes a first actuator 22A, which drives the slit switch 22, and a second actuator 24A, which drives the distance varying unit 24. The spectrum measuring apparatus 10 further includes a control unit 26 forming a slit controller and a distance controller, which input driving amounts of the actuators 22A, 24A as control values to the actuators 22A, 24A, respectively. An example in which vehicle driving assistance is performed based on a measurement result of the spectrum measuring apparatus 10 having such structure will now be described.

Figure 7:
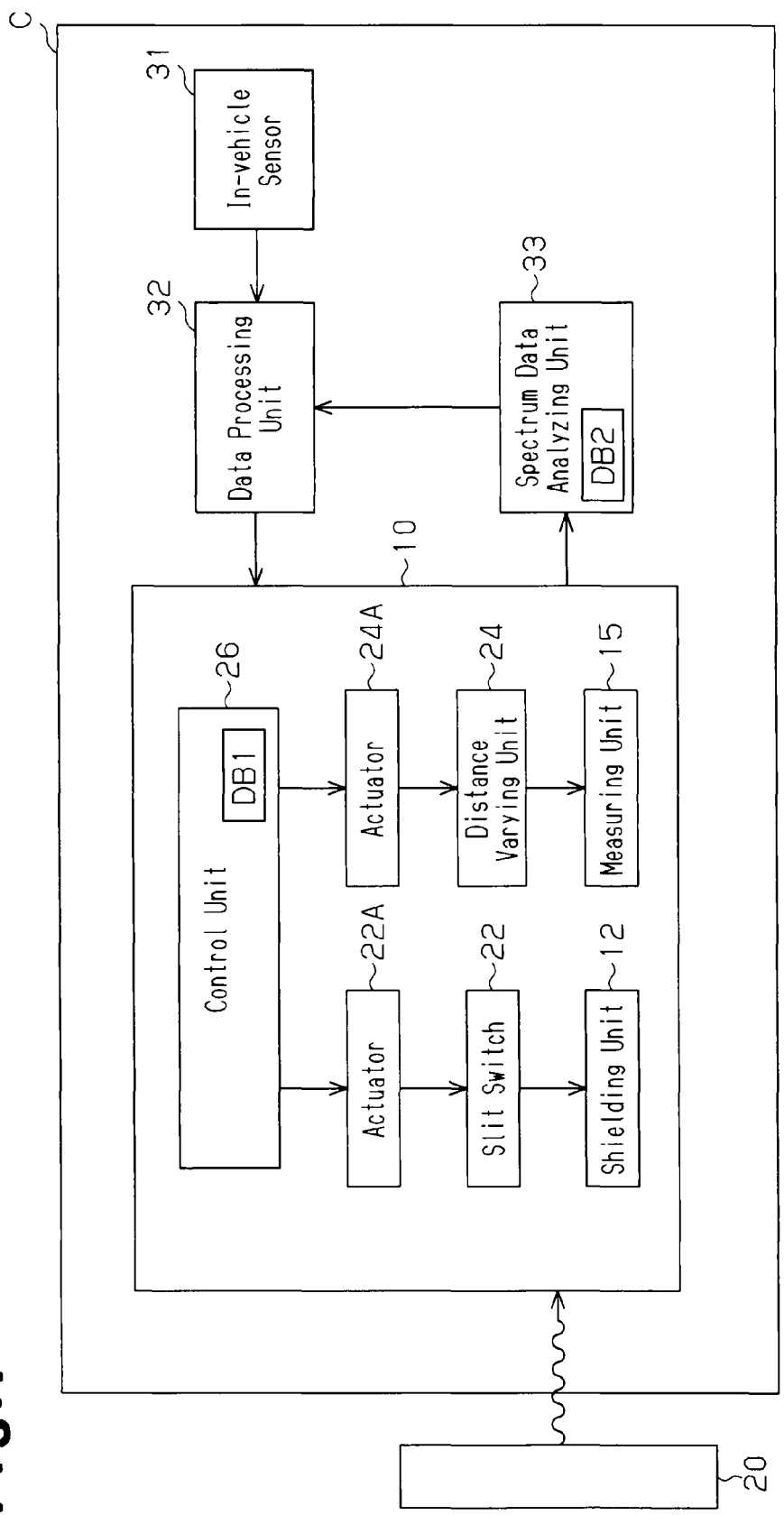
FIG. 7 is a block diagram entirely showing a spectrum measuring apparatus according to a fifth embodiment of the present invention.

As shown in FIG. 7, a vehicle C with the spectrum measuring apparatus 10 includes an in-vehicle sensor 31 formed by an ignition sensor, which detects whether an ignition is turned on or off, and an objective sensor such as an infrared radar, a millimeter-wave radar, and an in-vehicle camera, which detects the distance between the vehicle C and an object near the vehicle C. A data processing unit 32 for acquiring various detection results from the in-vehicle sensor 31 and generating various types of information necessary for spectrum measuring processing is arranged in the vehicle C that includes the in-vehicle sensor 31. Specifically, the data processing unit 32 generates information indicating whether or not the spectrum measuring apparatus 10 is to be activated based on a detection result from the ignition sensor and generates information indicating the distance between a candidate object necessary for driving assistance and the vehicle C based on a detection result from the objective sensor.

The control unit 26 for determining activation of the spectrum measuring apparatus 10 and controlling the driving amounts of the actuators 22A, 24A based on various types of information from the data processing unit 32 is arranged in the spectrum measuring apparatus 10 of the vehicle C.

The control unit 26 stores attribute data formed by a map in which the distance between the candidate object necessary for driving assistance and the vehicle C, that is, the distance between the measuring part and the slit group 12G, is associated with the number of measuring parts 20a of the measured object 20. Specifically, in the attribute data, the distance between the measuring parts and the slit group 12G is associated with the number of measuring parts 20a so that as the distance between the measuring parts 20a and the slit group 12G becomes shorter, the number of measuring parts 20a of the measured object 20 becomes smaller.

When the control unit 26 acquires information indicating the distance between the candidate object necessary for driving assistance and the vehicle C from the data processing unit 32, the control unit 26 refers to the attribute data and determines the number of measuring parts 20a, which corresponds to the distance between the candidate object and the vehicle C.

The control unit 26 also stores driving amount data DB1 that includes a table or the like in which the number of measuring parts 20a of the measured object 20 is associated with the driving amounts of the actuators 22A, 24A. Specifically, in the driving amount data DB1, the number of measuring parts 20a of the measured object 20 is associated with the driving amount of the first actuator 22A so that as the number of measuring parts 20a of the measured object 20 becomes smaller, the interval between adjacent slits 12b becomes longer. Further, in the driving amount data DB1, the driving amount of the first actuator 22A is associated with the driving amount of the second actuator 24A so that as the interval between adjacent slits 12b becomes longer, the distance between the spectroscope 14 and the measuring unit 15 becomes longer.

When the number of measuring parts 20a is determined, the control unit 26 refers to the driving amount data DB1 and calculates the driving amount of the first actuator 22A, which corresponds to the number of measuring parts 20a, and the driving amount of the second actuator 24A, which corresponds to the driving amount of the first actuator 22A. Then, the control unit 26 controls the actuators 22A, 24A with the corresponding driving amounts.

A spectrum data analyzing unit 33 for distinguishing each of the measuring parts based on the spectrum data acquired by the spectrum measuring apparatus 10 is arranged in the vehicle C including the spectrum measuring apparatus 10. The spectrum data analyzing unit 33 stores dictionary data DB2 formed by a table or the like in which data indicating various specific amounts of the spectrum is associated with various objects necessary for driving assistance. Specifically, in the dictionary data DB2, amounts of unique spectrum, such as a unique wavelength, intensity of the unique wavelength, peak shape of the unique wavelength, are associated with various objects necessary for driving assistance such as traffic light, signs, pedestrians, bicycles, and animals.

The spectrum data analyzing unit 33 that acquires the spectrum data from the spectrum measuring apparatus 10 refers to the dictionary data DB2 and generates an identification result of the object associated with each of the unique amounts of the spectrum data, that is, the measuring part, as identification data. Next, the spectrum data analyzing unit 33 outputs the identification data to each unit performing driving assistance, including a warning unit and a display unit that prompts the driver of the vehicle C to be careful, and various actuators of the vehicle C, based on the generated identification data, and allows each unit to perform driving assistance based on the identification data.

The series of spectrum measuring processes performed in the vehicle C including the spectrum measuring apparatus 10 in this embodiment will now be described with reference to FIG. 8. The spectrum measuring processing in this embodiment is repeatedly performed in predetermined operation cycles when the power state of the vehicle C is in an ACC (Accessory) ON state.

Figure 8:
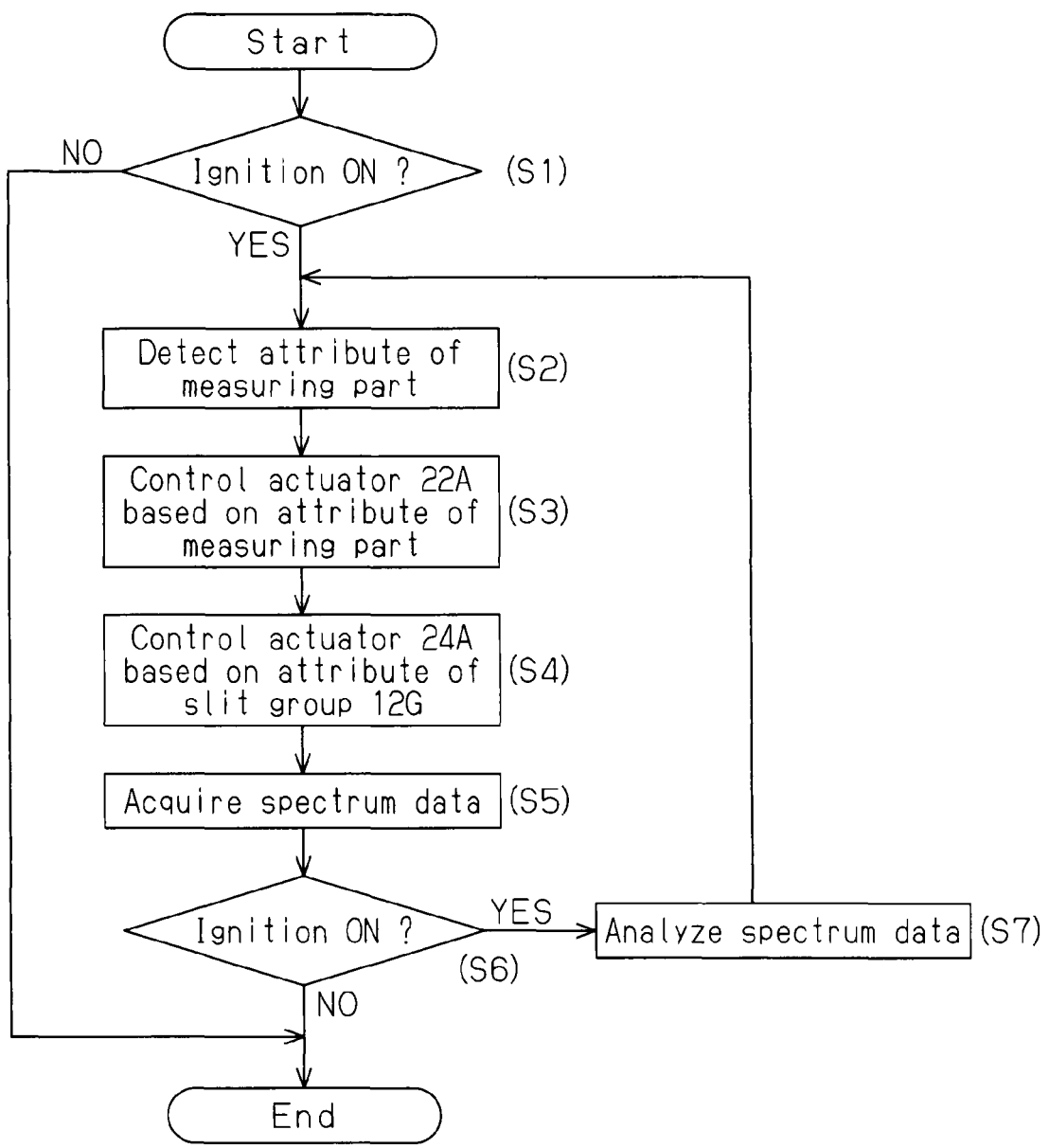
FIG. 8 is a flowchart showing a spectrum measuring procedure performed with the spectrum measuring apparatus according to the fifth embodiment of the present invention.

As shown in FIG. 8, in the spectrum measuring processing, the control unit 26 first determines whether the ignition is turned on or off based on a detection result of the ignition sensor to determine activation of the spectrum measuring apparatus 10 (step S1). When it is determined that the ignition is turned off, the control unit 26 finishes the spectrum measuring processing. When it is determined that the ignition is turned on, the control unit 26 acquires information indicating the distance between the candidate object necessary for driving assistance and the vehicle C through the data processing unit 32 and determines the number of measuring parts 20a, which corresponds to the distance, with reference to the attribute data. That is, the control unit 26 determines the number of measuring parts, or the attribute of the measuring parts, so that as the distance between the measuring parts 20a and the slit group 12G becomes shorter, the number of measuring parts of the measured object 20 becomes smaller (step S2).

When the attribute of the measuring parts is determined in this manner, the control unit 26 refers to the driving amount data DB1, calculates the driving amount of the first actuator 22A, which corresponds to the number of measuring parts 20a, and controls the first actuator 22A with the driving amount corresponding to the number of measuring parts 20a (step S3). That is, the control unit 26 selects the slit group 12G for measuring from the two or more different slit groups 12G so that as the number of measuring parts 20a of the measured object 20 becomes smaller, the interval between adjacent slits 12b becomes longer.

Next, the control unit 26 calculates the driving amount of the second actuator 24A, which is associated with the driving amount of the first actuator 22A, with reference to the driving amount data DB1, and controls the second actuator 24A with the driving amount corresponding to the driving amount of the first actuator 22A (step S4). In other words, the control unit 26 changes the distance between the spectroscope 14 and the measuring unit 15 based on the slit group 12G for measuring so that as the interval between adjacent slits 12b becomes longer, the distance between the spectroscope 14 and the measuring unit 15 becomes longer.

When the distance varying unit 24 associates the distance between the spectroscope 14 and the measuring unit 15 with the slit group 12G used for measuring by selecting the slit group 12G used for measuring in this manner, the control unit 26 acquires data indicating the intensity at each wavelength component of each measuring part from the measuring unit 15. Then, the spectrum data is generated so that the optical intensity at each wavelength component is associated with the wavelength (step S5).

At this time, when the distance between the candidate object necessary for driving assistance and the vehicle C is short, time required to perform driving assistance for the object also becomes short. Thus, high resolution of the wavelength components in the measured object is needed to distinguish the measured object in more detail. That is, a small number of the slits 12b is necessary. Conversely, when the distance between the candidate object necessary for driving assistance and the vehicle C is long, the time required to perform driving assistance for the object also becomes substantially long. Thus, high spatial resolution in the measured object is needed to distinguish measured object more simply. That is, a large number of the slits 12b is necessary.

In the spectrum measuring apparatus 10 of the above structure, as the distance between the measuring part and the slit group 12G becomes longer, the number of measuring parts of the measured object 20 increases. Thus, when the distance between the candidate object necessary for driving assistance and the vehicle C is longer, spatial resolution in the measured object becomes high. Conversely, when the distance between the candidate object necessary for driving assistance and the vehicle C is shorter, the resolution of the wavelength component in the measured object becomes high. Accordingly, since the spatial resolution and the resolution of the wavelength component in the measured object 20 are set to match the timing of driving assistance, the assistance accuracy in driving assistance can be improved.

When the number of measuring parts of the measured object 20 is small, the number of slits 12b corresponding to the measuring parts is also small. Thus, the light receiving area of the measuring unit 15 becomes small. When the number of measuring parts of the measured object 20 is large, the number of slits 12b corresponding to the measuring parts increases. Thus, the light receiving area of the measuring unit 15 becomes large in correspondence with the number of slits 12b.

In the spectrum measuring apparatus 10 of the above-mentioned structure, as the number of slits 12b becomes larger, the distance between the spectroscope 14 and the measuring unit 15 becomes shorter. Conversely, as the number of slits 12b becomes smaller, the distance between the spectroscope 14 and the measuring unit 15 becomes longer. Further, as described above, the number of the light receiving elements receiving dispersed light, that is, data amount of the measuring result, becomes larger as the measuring unit 15 moves away from the spectroscope 14 and, conversely, becomes smaller as the measuring unit 15 moves closer to the spectroscope 14. Thus, when the number of slits 12b is large, the amount of the spectrum data is suppressed toward a certain amount and, conversely, when the number of slits 12b is small, the amount of the spectrum data is increased toward the certain amount. Therefore, since the amount of measured data can be set to a generally fixed amount in correspondence with the slit group 12G used for measuring, an operation such as eliminating parts of the spectrum data or interpolating part of the spectrum data with dummy data becomes unnecessary. Thus, spectrum measurement including time for analyzing the spectrum data can be easily achieved in real time.

When the spectrum data is generated, the control unit 26 determines again whether the ignition is turned on or off based on the detection result of the ignition sensor (step S6). When it is determined that the ignition is turned off, the control unit 26 finishes the spectrum measuring processing. When it is determined that the ignition is turned on, the control unit 26 outputs the spectrum data to the spectrum data analyzing unit 33. Then, the control unit 26 allows the spectrum data analyzing unit 33 to generate the identification data indicating the identification result of the candidate object necessary for driving assistance, allows each unit performing driving assistance to output the identification data, and allows each unit to perform driving assistance, thereby repeating the above-mentioned processing (step S7).

As described above, the spectrum measuring apparatus 10 in the fifth embodiment has the advantages listed below in addition to the advantages of the above embodiments.

(14) The control unit 26 of the spectrum measuring apparatus 10 determines the number of measuring parts 20a as the attribute of the measuring parts based on the distance between the measured object 20 and the slit group 12G. Thus, the switching aspect of the slit group 12G for measuring can be controlled based on the distance between the measured object 20 and the slit group 12G. As a result, for example, when the distance between the spectrum measuring apparatus 10 and the measured object 20 is short, the number of slits 12b can be decreased thereby decreasing the spatial resolution of the measured object 20. Further, for example, when the distance between the spectrum measuring apparatus 10 and the measured object 20 is long, the number of slits 12b can be increased thereby increasing the spatial resolution of the measured object 20. Therefore, spectrum measurement effectively using the range of the measured object 20 can be achieved in real time.

(15) The control unit 26 of the spectrum measuring apparatus 10 controls changes in the distance between the spectroscope 14 and the measuring unit 15 with the distance varying unit 24 based on the number of slits 12b serving as the attribute of the slit group 12G. Thus, since the distance between the spectroscope 14 and the measuring unit 15 can be controlled based on the number of slits 12b used for measuring, for example, when the number of slits 12b used for measuring is large, the data amount can be suppressed to a substantially fixed amount by decreasing the resolution of the wavelength component in the spectrum while increasing the spatial resolution. Conversely, when the number of slits 12b used for measuring is small, the data amount can become closer to the fixed amount by increasing the resolution of the wavelength component while decreasing the spatial resolution. Accordingly, even when the slit groups 12G having different attributes, for example, different number of slits 12b, are applied as the slit group 12G used for measuring, as described above, the data amount or the resolution of the wavelength component can be adjusted while adjusting the spatial resolution.

The above embodiments may be modified as described below.

In the fifth embodiment, the spectrum measuring apparatus 10 is mounted on the vehicle C serving as the mobile body but not limited in such a manner, and the switching of the slit switch 22 may be controlled according to the control value corresponding to the attribute of the measuring parts 20a. Even when the spectrum measuring apparatus 10 is not mounted on a mobile body, the same advantages as advantages (14) and (15) of the fifth embodiment can be obtained.

In the fifth embodiment, the spectrum measuring apparatus 10 is mounted on the vehicle C serving as the mobile body but not limited in such a manner, and the distance between the spectroscope 14 and the measuring unit 15 changed by the distance varying unit 24 may be controlled according to the control value corresponding to the attribute of the slit group 12G. Even when the spectrum measuring apparatus 10 is not mounted on a mobile body, the same advantages as advantages (14) and (15) of the fifth embodiment can be obtained.

In fifth embodiment, the switching of the slit switch 22 is controlled based on the control value corresponding to the attribute of the measuring parts 20a, and the distance between the spectroscope 14 and the measuring unit 15 changed by the distance varying unit 24 is controlled based on the control value corresponding to the attribute of the slit group 12G. However, for example, the distance between the spectroscope 14 and the measuring unit 15 may be fixed and only the switching aspect of the slit switch 22 may be controlled based on the attribute of the measuring parts 20a. Even in such a structure, the same advantages as advantage (14) of the fifth embodiment can be obtained. Alternatively, the slit group 12G may be fixed and only the distance between the spectroscope 14 and the measuring unit 15 changed by the distance varying unit 24 may be controlled based on the attribute of the slit group 12G. Even in such a structure, the same advantages as advantage (15) of the fifth embodiment can be obtained.

In the fifth embodiment, the spectrum measuring apparatus 10 includes the shielding unit 12 and the slit switch 22, which are described in the second embodiment, and the distance varying unit 24, which is described in the third embodiment. Further, the two or more different slit groups 12G of the shielding unit 12 are different from each other in the attribute such as the number of slits 12b. However, the present invention is not limited in such a manner. For example, the slit group 12G in which the three slits 12b are eccentrically arranged around the center in the width direction Dw, which is the arrangement direction of the slits 12b, as described in the fourth embodiment may be one of two or more different slit groups 12G. Even in such a structure, the same advantages as advantages (14) and (15) of the fifth embodiment can be obtained.

In the fifth embodiment, the attribute of the measuring part 20a is embodied as the number of measuring parts 20a but not limited in such a manner. The attribute of the measuring parts 20a may be embodied as size of the measuring parts 20a and position of the measuring parts 20a in the measured object. Even in such a structure, the same advantages as advantages (14) and (15) of the fifth embodiment can be obtained.

In the fifth embodiment, the control unit 26 determines the attribute of the measuring parts 20a based on the distance between the measured object 20 and the slit group 12G. However, the present invention is not limited in such a manner and, for example, the suitable attribute of the measuring parts 20a, such as position, number, and size of the measuring parts 20a in the measured object 20 may be determined based on driving state such as the surrounding environment of the measured object 20 or behavior of the vehicle C. Even in such a structure, the same advantages as advantages (14) and (15) of the fifth embodiment can be obtained.

In the fifth embodiment, the attribute of the measuring parts 20a is embodied as the number of measuring parts 20a but not limited in such a manner. The attribute of the slit group 12G may be embodied as the interval between adjacent slits 12b or position of the eccentric slits 12b. Even in such a structure, the same advantages as advantages (14) and (15) of the fifth embodiment can be obtained.

In the fifth embodiment, as the distance between the measuring part 20a and the slit group 12G becomes shorter, the number of measuring parts 20a of the measured object 20 becomes smaller. However, for example, as the distance between the measuring part 20a and the slit group 12G becomes shorter, the number of measuring parts 20a of the measured object 20 may become larger. In such a structure, as the measured object 20 moves closer to the spectrum measuring apparatus 10, the spatial resolution can be increased.

In the fifth embodiment, the spectrum measuring apparatus 10 includes the control unit 26. This structure may be changed so that the vehicle C includes the control unit 26. Further, although the vehicle C includes the spectrum data analyzing unit 33, this structure may be changed so that the spectrum measuring apparatus 10 includes the spectrum data analyzing unit 33. Even in such a structure, the same advantages as advantages (14) and (15) of the fifth embodiment can be obtained.

In the fifth embodiment, the slit group 12G is switched based on the distance between the measured object 20 and the slit group 12G, and the distance between the spectroscope 14 and the measuring unit 15 is adjusted based on the attribute of the switched slit group 12G. However, the present invention is not limited in such a manner and, for example, the position, size, or number of the measuring parts 20a suitable for the driving state, including the surrounding environment such as day or night, rain or shine, and driving place (urban area or farm area), the analysis result of the spectrum measuring apparatus 10, and the behavior of the vehicle C of the spectrum measuring apparatus 10 may be used as the attribute of the measuring parts 20a used for switching the slit group 12G. Even in such a structure, the same advantages as advantages (14) and (15) of the fifth embodiment can be obtained.

In the fourth embodiment, the wavelength band that allows the band-pass filter 13 to pass therethrough differs according to the interval between adjacent slits 12b, and the spread of each wavelength component dispersed from the spectroscope 14 varies according to the interval between adjacent slits 12b. However, the present invention is not limited in such a manner, and the wavelength band that allows the band-pass filter 13 to pass therethrough may be the same irrespective of the interval between adjacent slits 12b, and the spread of each wavelength component dispersed from the spectroscope may differ according to the interval between adjacent slits 12b. For example, in the fourth embodiment, such a structure may be obtained by a one band-pass filter 13 and two types of different spectroscopes 14 in which the spread of each wavelength component differs according to the interval between adjacent slits 12b. Even in such a structure, the same advantages as the fourth embodiment may be obtained.

In the third and fifth embodiments, the distance between the spectroscope 14 and the measuring unit 15 is changed by the movement of the measuring unit 15. However, the present invention is not limited in such a manner, and the spectroscope 14 may be moved. Alternatively, the spectroscope 14 and the measuring unit 15 may both be moved. In such structures, to increase the resolution of the wavelength component there is no need for a margin of movement for the measuring unit 15. In other words, the spectrum measuring apparatus 10 can be miniaturized. This increases the degree of freedom in design of the vehicle C, which serves as the mobile body in which the miniaturized spectrum measuring apparatus 10 is arranged.

The shielding unit 12 and the band-pass filter 13, which includes two types of band-pass filters, of the fourth embodiment can be applied to the one of the two or more slit groups 12G and the corresponding band-pass filter 13 of the second embodiment. This obtains the same advantages as the second embodiment.

The shielding unit 12 and the band-pass filter 13, which includes the two types of band-pass filters, of the fourth embodiment can be applied to the shielding unit 12 and the band-pass filter 13 of the third embodiment. This obtains the same advantages as the third embodiment.

Figure 9:
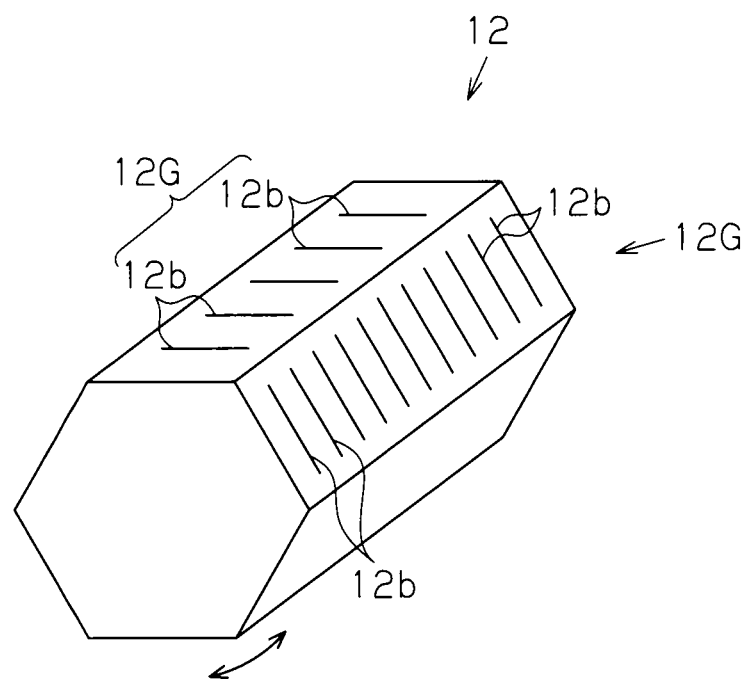
FIG. 9 is a perspective view showing a modified example of shielding plate for a spectrum measuring apparatus.
Figure 10:
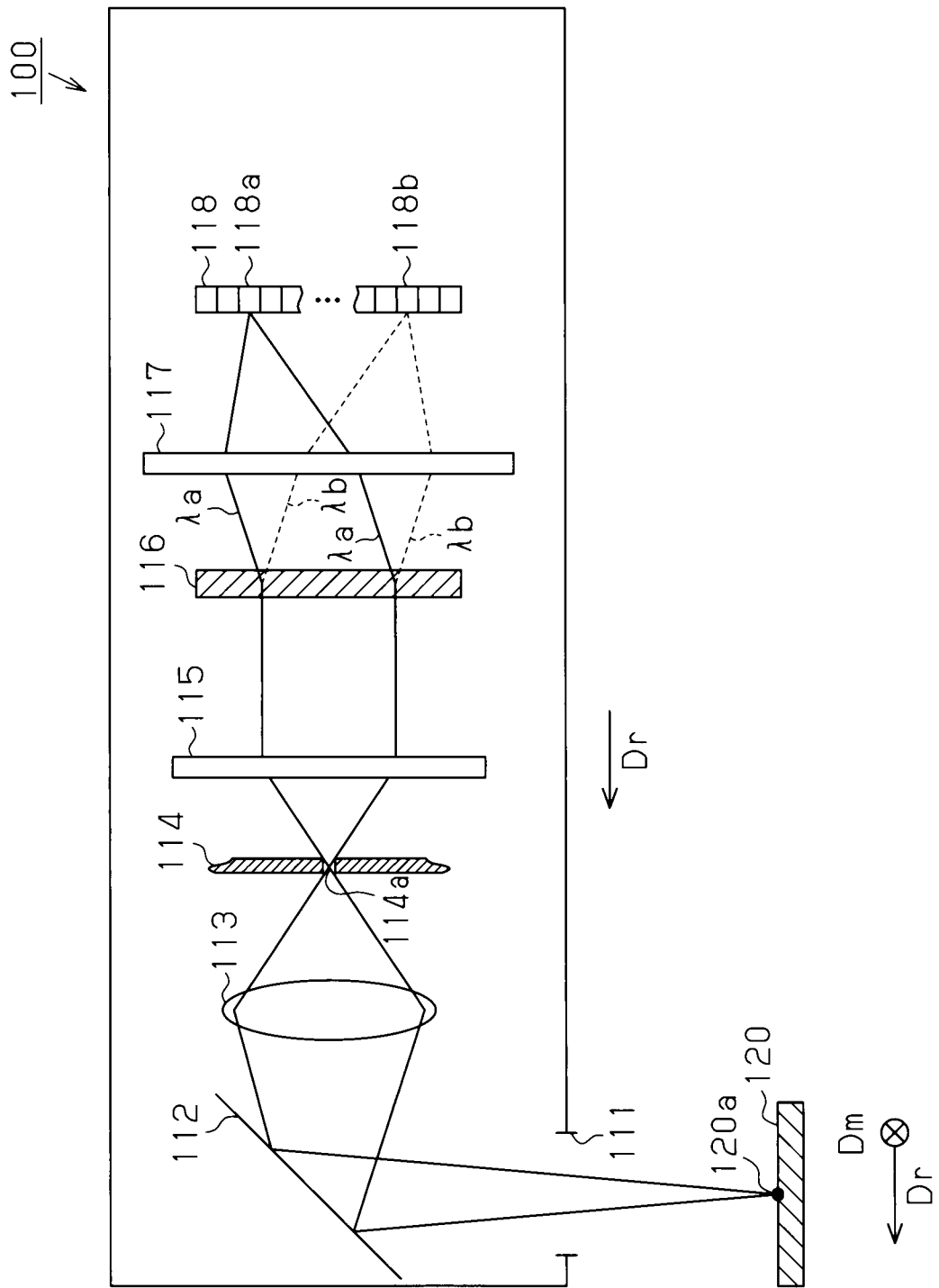
FIG. 10 is a diagram showing one example of an optical structure when a hyper spectrum sensor, which is a conventional spectrum measuring apparatus, is mounted on an artificial satellite.

The shielding plate 12a forming the shielding unit 12 is disk-shaped in the second embodiment. However, the present invention is not limited in such a manner. For example, as shown in FIG. 9, the shielding plate 12a may have the shape of a hexagonal tube as long as it has the two or more different slit groups 12G. Further, the shielding plate 12a may have the shape of a flat polygonal plate or a polygonal tube instead of the shape of a flat polygonal plate or hexagonal tube. This increases the degree of freedom in design of the shielding unit 12.

Each of the slits 12b includes the optical element 12c in each of the above embodiments. However, the present invention is not limited to such a structure. For example, a collimator shared by each of the slits 12b may be arranged between the shielding unit 12 and the spectroscope 14. Alternatively, each of the slits 12b may be arranged so that light from the slits 12b do not interfere with each other. In such a structure, the optical elements 12c may be eliminated thereby facilitating the manufacturing of the shielding unit 12.

In the above embodiments, the band-pass filter 13 that passes only light in the measuring band is arranged in the spectrum measuring apparatus 10. However, the band-pass filter 13 may be eliminated as long as the wavelength components dispersed by the spectroscope 14 do not interfere with each other. This simplifies the structure of the spectrum measuring apparatus 10 and facilitates the manufacturing of the spectrum measuring apparatus 10.

In the above embodiments, the band-pass filter 13 is arranged between the shielding unit 12 and the spectroscope 14. However, the arrangement of the band-pass filter 13 is not limited in such a manner as long as the band-pass filter 13 is arranged in the preceding stage of the measuring unit 15. In other words, as long as light in the measuring band enters the light receiving elements of the measuring unit 15, the band-pass filter 13 may be arranged at any position. This increases the degree of freedom in design of the spectrum measuring apparatus 10.

In the above embodiments, the slits 12b are formed as apertures extending in the longitudinal direction Dm, that is, in the direction perpendicular to the planes of FIGS. 1, 3, 4 and 5. However, the present invention is not limited in such a manner. More specifically, as long as light from the slits 12b do not interfere with each other, the slits 12b, which are apertures, can be formed in any direction. For example, instead of being parallel to the direction perpendicular to the planes of FIGS. 1, 3, 4 and 5, the direction of the slits 12b, which are apertures, may be diagonal relative to that direction. In addition, the slits 12b, which are apertures, may have any length and those with long lengths and those with short lengths may be mixed. Even in such a structure, the same advantages as the above embodiments are obtained. In particular, in the fourth embodiment, the shielding unit 12 may include the slit group 12G that measures the part of which the spectrum can be measured with the high spatial resolution and the part of which the spectrum can be measured with the high resolution of the wavelength component in further detail.

In the above embodiments, the two or more slits 12b are arranged in the width direction Dw. However, the two or more slits 12b may be arranged in two or more different directions and an optical system may be provided for each row. Even in such a structure, the same advantages as the above embodiments can be achieved. In particular, in the fourth embodiment, the shielding unit 12 may include the slit group 12G that measure the part of which the spectrum can be measured with the high spatial resolution and the part of which the spectrum can be measured with the high resolution of the wavelength component in further detail.

DESCRIPTION OF REFERENCE NUMERALS

10: spectrum measuring apparatus, 11: condenser, 12: shielding unit, 12a: shielding plate, 12b: slit, 12c: optical element, 12G: slit group, 13: band-pass filter, 13a: first band-pass filter, 13b: second band-pass filter, 14: spectroscope, 15: measuring unit, 20: measured object, 20a: measuring part, 22: slit switch, 23: matching unit, 24: distance varying unit, 100: hyper spectrum sensor, 111: inlet, 112: mirror, 113: collimator, 114: shielding plate, 114a: single slit, 115: collimator, 116: spectroscope, 117: imager, 118: measuring unit, 118a: light receiving element, 118b: light receiving element, 120: object, 120a: measuring part.

The invention claimed is:

1. A spectrum measuring apparatus comprising:
   a slit group including three or more slits,
   a measured object including three or more different measuring parts, wherein each respective slit receives light from a single respective measuring part;
   a spectroscope that disperses the light extracted by the slit group for each of the slits;
   and
   a measuring unit, wherein the measuring unit includes two or more light receiving elements that directly receive, from the spectroscope, each component of the light dispersed by the spectroscope, and
   the spectrum measuring apparatus further comprises a distance varying unit that allows varying of a distance between the spectroscope and the measuring unit without interference of the components of the light dispersed by the spectroscope in an optical path preceding the light receiving elements,
   wherein the slits are arranged eccentrically so that an interval between the slits near a central part in an arrangement direction of the slits is narrower than an interval between the slits near both ends in the arrangement direction.

2. The spectrum measuring apparatus according to claim 1, wherein
   the slit group is one of two or more different slit groups in the spectrum measuring apparatus, and
   the spectrum measuring apparatus further comprises a slit switch that allows switching of one slit group, which passes light that is to be dispersed to the spectroscope, between the two or more different slit groups.

3. The spectrum measuring apparatus according to claim 1, further comprising a distance controller that controls the varying of the distance varying unit based on a control value that is in accordance with an attribute of the slit group.

4. The spectrum measuring apparatus according to claim 2, further comprising a slit controller that controls switching of the slit switch based on a control value that is in accordance with an attribute of the measuring parts.

5. The spectrum measuring apparatus according to claim 4, wherein the slit controller determines the attribute of the measuring parts based on a distance between the measured object and the slit group.

6. The spectrum measuring apparatus according to claim 1, further comprising a band-pass filter that guides only a wavelength component in a measuring band to the spectroscope.

7. The spectrum measuring apparatus according to claim 6, wherein the band-pass filter is configured so that the measuring band narrows as an interval between adjacent ones of the slits shortens.

8. The spectrum measuring apparatus according to claim 1, wherein each of the two or more slits includes an optical element that converts light passed through the slits into converged light or collimated light.

9. The spectrum measuring apparatus according to claim 2, wherein the two or more different slit groups differ from each other in their number of the slits.

10. The spectrum measuring apparatus according to claim 1, wherein the spectrum measuring apparatus is mounted on a mobile body.

11. A spectrum measuring apparatus comprising:
a slit group including three or more slits,
a measured object including three or more different measuring parts, wherein each respective slit receives light from a single measuring part;
a spectroscope that disperses the light extracted by the slit group for each of the slits;
and
a measuring unit, wherein the measuring unit includes two or more light receiving elements that directly receive, from the spectroscope, each component of the light dispersed by the spectroscope,
wherein the slits are arranged eccentrically so that an interval between the slits near a central part in an arrangement direction of the slits is narrower than an interval between the slits near both ends in the arrangement direction.

* * * * *